United States Patent
Tjiong

(10) Patent No.: US 10,503,483 B2
(45) Date of Patent: Dec. 10, 2019

(54) RULE BUILDER IN A PROCESS CONTROL NETWORK

(71) Applicant: FISHER-ROSEMOUNT SYSTEMS, INC., Round Rock, TX (US)

(72) Inventor: Ching Lung Tjiong, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 973 days.

(21) Appl. No.: 15/042,797

(22) Filed: Feb. 12, 2016

(65) Prior Publication Data

US 2017/0236067 A1    Aug. 17, 2017

(51) Int. Cl.
   *G06F 8/34* (2018.01)
   *G05B 23/02* (2006.01)
   (Continued)

(52) U.S. Cl.
   CPC ........... *G06F 8/34* (2013.01); *G05B 23/0229* (2013.01); *G05B 23/0272* (2013.01);
   (Continued)

(58) Field of Classification Search
   CPC ......... H04L 41/12; H04L 67/10; G06N 20/00; G06F 8/10; G06F 17/5009; G06F 9/4488; G09B 9/00; G05B 15/02; G05B 19/042
   See application file for complete search history.

(56) References Cited

U.S. PATENT DOCUMENTS

| | | |
|---|---|---|
| 4,451,047 A | 5/1984 | Herd et al. |
| 4,593,367 A | 6/1986 | Slack et al. |

(Continued)

FOREIGN PATENT DOCUMENTS

| | | |
|---|---|---|
| AU | 2010257310 A1 | 7/2012 |
| CN | 1409179 A | 4/2003 |

(Continued)

OTHER PUBLICATIONS

Notice of Reasons for Rejection for Japanese Application No. 2014-041785, dated Dec. 5, 2017.

(Continued)

*Primary Examiner* — Kandasamy Thangavelu
(74) *Attorney, Agent, or Firm* — Marshall, Gerstein & Borun LLP

(57) ABSTRACT

An analytic rule generation application is integrated into an electronic customer technical support system to enable those using the customer technical support center systems to build custom analytic rules, on demand, for use in diagnosing and detecting issues at customer process plant sites, without having to submit a request to a developer and wait for one or more new rules to be provided in future releases of the customer technical support system. The analytic rule builder can be used by local offices and local technology groups if need be, or can be used by personnel at customer sites. The custom analytic rules created using the rule builder application can be shared among the engineers using the electronic customer technical support system to empower local engineers to immediately use newly created rules. Still further, the analytic rule builder can be used in an online support system within a process plant, where on-site engineers can build custom analytic rules to monitor certain data streams or events in the plant control system and to trigger actions upon the detection of predetermined events or conditions.

49 Claims, 11 Drawing Sheets

(51) Int. Cl.
  *G06F 3/048* (2013.01)
  *G06F 3/0486* (2013.01)
(52) U.S. Cl.
  CPC .......... *G06F 3/048* (2013.01); *G06F 3/0486* (2013.01); *Y02P 90/02* (2015.11)

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 | 12/2009 | Veeningen et al. |
| 7,640,007 B2 | 12/2009 | Chen et al. |
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |

(56) References Cited

U.S. PATENT DOCUMENTS

| | | |
|---|---|---|
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,890,461 B2 | 2/2011 | Oeda et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,244,452 B2 | 1/2016 | Brandes et al. |
| 9,285,795 B2 * | 3/2016 | Nixon .................. G06F 9/4488 |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,466,038 B2 | 10/2016 | Kezeu |
| 9,516,354 B1 | 12/2016 | Verheem et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2002/0188366 A1 | 12/2002 | Pepper et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0186927 A1 * | 9/2004 | Eryurek ............... G05B 15/02 710/12 |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2004/0259533 A1 | 12/2004 | Nixon et al. |
| 2005/0005259 A1 | 1/2005 | Avery et al. |
| 2005/0007249 A1 | 1/2005 | Eryurek et al. |
| 2005/0033481 A1 | 2/2005 | Budhraja et al. |
| 2005/0049835 A1 | 3/2005 | Mayer et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |

(56) References Cited

U.S. PATENT DOCUMENTS

| | | |
|---|---|---|
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0197806 A1 | 9/2005 | Eryurek et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0118516 A1 | 5/2007 | Li et al. |
| 2007/0130310 A1 | 6/2007 | Batke et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1* | 8/2007 | Nixon .................. G05B 19/042 700/83 |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0085682 A1 | 4/2008 | Rao |
| 2008/0086428 A1 | 4/2008 | Wallace |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0114710 A1* | 5/2008 | Pucher .................. G06N 20/00 706/20 |
| 2008/0125912 A1 | 5/2008 | Heilman et al. |
| 2008/0126352 A1 | 5/2008 | Case |
| 2008/0126665 A1 | 5/2008 | Burr et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0048853 A1 | 2/2009 | Hall |
| 2009/0049073 A1 | 2/2009 | Cho |
| 2009/0059814 A1* | 3/2009 | Nixon .................... H04L 41/12 370/254 |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284383 A1 | 11/2009 | Wiles et al. |
| 2009/0292514 A1* | 11/2009 | McKim ..................... G09B 9/00 703/6 |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0270855 A1 | 11/2011 | Antonysamy |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0295578 A1* | 12/2011 | Aldrich ..................... G06F 8/10 703/6 |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |

(56) References Cited

U.S. PATENT DOCUMENTS

| | | |
|---|---|---|
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0249588 A1 | 10/2012 | Tison et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0166542 A1 | 6/2013 | Kulkarni et al. |
| 2013/0169526 A1 | 7/2013 | Gai et al. |
| 2013/0184847 A1 | 7/2013 | Fruh et al. |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122026 A1* | 5/2014 | Aberg ............... G06F 17/5009 703/1 |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0129002 A1 | 5/2014 | Brandes et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0207415 A1 | 7/2014 | Bhutani et al. |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1* | 9/2014 | Nixon ............... G06F 17/5009 715/786 |
| 2014/0282257 A1 | 9/2014 | Nixon et al. |
| 2014/0282722 A1 | 9/2014 | Kummer et al. |
| 2014/0297225 A1 | 10/2014 | Petroski et al. |
| 2014/0303754 A1 | 10/2014 | Nixon et al. |
| 2014/0316579 A1 | 10/2014 | Taylor et al. |
| 2014/0335480 A1 | 11/2014 | Asenjo et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0067163 A1 | 3/2015 | Bahnsen et al. |
| 2015/0077263 A1 | 3/2015 | Ali et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0185716 A1 | 7/2015 | Wichmann et al. |
| 2015/0193418 A1* | 7/2015 | Koska ............... H04L 67/10 715/223 |
| 2015/0199494 A1 | 7/2015 | Koduri et al. |
| 2015/0212679 A1 | 7/2015 | Liu |
| 2015/0220080 A1 | 8/2015 | Nixon et al. |
| 2015/0222731 A1 | 8/2015 | Shinohara et al. |
| 2015/0246852 A1 | 9/2015 | Chen et al. |
| 2015/0254330 A1 | 9/2015 | Chan et al. |
| 2015/0261215 A1 | 9/2015 | Blevins et al. |
| 2015/0277399 A1 | 10/2015 | Maturana et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0281607 A1 | 9/2016 | Asati et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0102969 A1 | 4/2017 | Kochunni et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0223075 A1 | 8/2017 | Hong et al. |
| 2017/0235298 A1 | 8/2017 | Nixon et al. |
| 2017/0238055 A1 | 8/2017 | Chang et al. |
| 2017/0255826 A1 | 9/2017 | Chang et al. |
| 2017/0255827 A1 | 9/2017 | Chang et al. |
| 2017/0255828 A1 | 9/2017 | Chang et al. |
| 2017/0255829 A1 | 9/2017 | Chang et al. |
| 2018/0012510 A1 | 1/2018 | Asenjo et al. |
| 2018/0151037 A1 | 5/2018 | Morgenthau et al. |
| 2018/0343544 A1 | 11/2018 | Fan et al. |

FOREIGN PATENT DOCUMENTS

| | | |
|---|---|---|
| CN | 1409232 A | 4/2003 |
| CN | 1537258 A | 10/2004 |
| CN | 1589423 A | 3/2005 |

(56) References Cited

FOREIGN PATENT DOCUMENTS

| | | | |
|---|---|---|---|
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101169799 A | 4/2008 |
| CN | 101187869 A | 5/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101822050 A | 9/2010 |
| CN | 101828195 A | 9/2010 |
| CN | 101867566 A | 10/2010 |
| CN | 102063097 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102780568 A | 11/2012 |
| CN | 102801779 A | 11/2012 |
| CN | 102867237 A | 1/2013 |
| CN | 103106188 A | 5/2013 |
| CN | 103403686 A | 11/2013 |
| CN | 103576638 A | 2/2014 |
| CN | 103699698 A | 4/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 06-052145 A | 2/1994 |
| JP | 08-234951 | 9/1996 |
| JP | 09-330861 A | 12/1997 |
| JP | 10-116113 A | 5/1998 |
| JP | 10-326111 A | 12/1998 |
| JP | 11-327628 A | 11/1999 |
| JP | 2000-214914 A | 8/2000 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-99325 A | 4/2002 |
| JP | 2003-295944 A | 10/2003 |
| JP | 2003-337794 A | 11/2003 |
| JP | 2004-030492 A | 1/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-348582 A | 12/2004 |
| JP | 2005-107758 A | 4/2005 |
| JP | 2005-216137 A | 8/2005 |
| JP | 2005-242830 A | 9/2005 |
| JP | 2005-332093 A | 12/2005 |
| JP | 2006-172462 A | 6/2006 |
| JP | 2006-221376 A | 8/2006 |
| JP | 2006-221563 A | 8/2006 |
| JP | 2006-527426 A | 11/2006 |
| JP | 2007-137563 A | 6/2007 |
| JP | 2007-148938 A | 6/2007 |
| JP | 2007-207065 A | 8/2007 |
| JP | 2007-242000 A | 9/2007 |
| JP | 2007-286798 A | 11/2007 |
| JP | 2007-536631 A | 12/2007 |
| JP | 2007-536648 A | 12/2007 |
| JP | 2008-009793 A | 1/2008 |
| JP | 2008-065821 A | 3/2008 |
| JP | 2008-158971 A | 7/2008 |
| JP | 2008-305419 A | 12/2008 |
| JP | 2009-064451 A | 3/2009 |
| JP | 2009-135892 A | 6/2009 |
| JP | 2009-140380 A | 6/2009 |
| JP | 2009-211522 A | 9/2009 |
| JP | 2009-251777 A | 10/2009 |
| JP | 2009-538567 A | 11/2009 |
| JP | 2010-181949 A | 8/2010 |
| JP | 2010-527486 A | 8/2010 |
| JP | 2010-250825 A | 11/2010 |
| JP | 2011-022920 A | 2/2011 |
| JP | 2011-034564 A | 2/2011 |
| JP | 2011-180629 A | 9/2011 |
| JP | 2011-204237 A | 10/2011 |
| JP | 2011-204238 A | 10/2011 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-215547 A | 11/2012 |
| JP | 2012-527059 A | 11/2012 |
| JP | 2012/252604 A | 12/2012 |
| JP | 2014-116027 A | 6/2014 |
| JP | 2014-523579 A | 9/2014 |
| TW | 201408020 A | 2/2014 |
| WO | WO-02/50971 | 6/2002 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2007/052342 A1 | 5/2007 |
| WO | WO-2008/042786 A2 | 4/2008 |
| WO | WO-2009/021900 A1 | 2/2009 |
| WO | WO-2009/046095 A1 | 4/2009 |
| WO | WO-2010/041462 A1 | 4/2010 |

(56) References Cited

FOREIGN PATENT DOCUMENTS

| WO | WO-2011/120625 A1 | 10/2011 |
|----|-------------------|---------|
| WO | WO-2012/016012 A2 | 2/2012 |
| WO | WO-2012/022381 A1 | 2/2012 |
| WO | WO-2012/096877 A1 | 7/2012 |
| WO | WO-2012/129400 A2 | 9/2012 |
| WO | WO-2012/177812 A1 | 12/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-049918, dated Dec. 12, 2017.
Notice of Reasons for Rejection for Japanese Application No. 2014-049919, dated Nov. 29, 2017.
Notice of Reasons for Rejection for Japanese Application No. 2014-051114, dated Dec. 28, 2017.
Notice of Reasons for Rejection for Japanese Application No. 2014-051596, dated Jan. 9, 2018.
Notice of Reasons for Rejection for Japanese Application No. 2014-051597, dated Jan. 9, 2018.
Extended European Search Report for Application No. 17157505.3, dated Jun. 30, 2017.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
Decision of Refusal for Japanese Application No. 2014-048410, dated May 29, 2018.
Decision of Rejection for Chinese Application No. 201410097675.2, dated Jul. 2, 2018.
Examination Report for Application No. EP 14724871.0, dated Aug. 10, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-049919, dated Jul. 31, 2018.
Notice of Reasons for Rejection for Japanese Application No. 2014-049920, dated Jun. 5, 2018.
Notice of Reasons for Rejection for Japanese Application No. 2014-051595, dated May 29, 2018.
Notice of Reasons for Rejection for Japanese Application No. 2014-051596, dated May 29, 2018.
Second Office Action for Chinese Application No. 201410097623.5, dated Jun. 26, 2018.
Second Office Action for Chinese Application No. 201410097872.4 dated Jul. 12, 2018.
Second Office Action for Chinese Application No. 201410097921.4, dated Jul. 5, 2018.
Second Office Action for Chinese Application No. 201410098326.2, dated Jun. 19, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
Decision of Refusal for Japanese Application No. 2014-048412, dated Oct. 26, 2018.
Decision of Refusal for Japanese Application No. 2014-051597, dated Nov. 13, 2018.
Decision of Rejection for Chinese Application No. 201410097873.9, dated Dec. 5, 2018.
Decision of Rejection for Chinese Application No. 201410098982.2, dated Jan. 23, 2019.
First Office Action for Chinese Application No. 201510640227.7, dated Mar. 15, 2019.
First Office Action for Chinese Application No. 201510640439.5, dated Feb. 25, 2019.
First Office Action for Chinese Application No. 201510641015.0, dated Feb. 27, 2019.
First Office Action for Chinese Application No. 201580054441.2, dated Feb. 27, 2019.
Notice of Reasons for Rejection for Japanese Application No. 2014-051114, dated Mar. 5, 2019.
Notice of Reasons for Rejection for Japanese Application No. 2014-051598, dated Nov. 13, 2018.
Notice of Reasons for Rejection for Japanese Application No. 2015-015738, dated Mar. 12, 2019.
Notice of Reasons for Rejection for Japanese Application No. 2015-159015, dated Mar. 19, 2019.
Notice of Reasons for Rejection for Japanese Application No. 2016-503431, dated Jan. 8, 2019.
Third Office Action for Chinese Application No. 201410098326.2, dated Jan. 17, 2019.
Third Office Action for Chinese Application No. 201410099068.X, dated Jan. 16, 2019.
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.

(56) References Cited

OTHER PUBLICATIONS

International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245/?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mandavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
"ANSI/ISA-S5.4-1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation*, 2011, Chapter 7.
"IoT and Big Data Combine Forces," (2013). Retrieved from the Internet at: URL:http://wiki.advantech.com/images/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot/iot_in_manufacturing_january.pdf.
Communication Relating to the Results of the Partial International Search, dated Jul. 11, 2014.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
International Search Report and Written Opinion for Application No. PCT/US2014/030627, dated Sep. 11, 2014.
International Search Report and Written Opinion for Application No. PCT/US2015,053931, dated Jan. 26, 2016.
International Search Report and Written Opinion for Application No. PCT/US2015/020148, dated Jun. 18, 2015.
Krumeich et al., "Big Data Analytics for Predictive Manufacturing Control—A Case Study from Process Industry," IEEE International Congress on Big Data, pp. 530-537 (2014).
Notice of Reasons for Rejection for Japanese Application No. 2010-229513, dated Jul. 29, 2014.
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
Search Report for Application No. GB1513617.9, dated Jan. 21, 2016.
Smalley, "GE Invests in Project to Embed Predictive Analytics in Industrial Internet," (2013). Retrieved from the Internet at: URL:http://data-informed.com/ge-invents-in-project-to-embed-predictive-analytics-in-industrial-internet/.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".
U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: http://forbes.com/sites/bwoo/2013/02/27/intel-drops-a-big-data-shocker/?partner=ya dated Feb. 27, 2013.

(56) References Cited

OTHER PUBLICATIONS

Examination Report for Application No. EP 14724871.0, dated Aug. 17, 2016.
Decision of Refusal for Japanese Application No. 2014-049918, dated Aug. 21, 2018.
Decision of Refusal for Japanese Application No. 2014-051595, dated Sep. 11, 2018.
Decision of Refusal for Japanese Application No. 2014-051596, dated Oct. 23, 2018.
Examination Report for Application No. GB1402311.3, dated Sep. 28, 2018.
Examination Report for Application No. GB14724871.0, dated Oct. 8, 2018.
Final Rejection for Japanese Application No. 2014-049915, dated Nov. 6, 2018.
Notice of Reasons for Rejection for Japanese Application No. 2014-049916, dated Aug. 28, 2018.
Notice of Reasons for Rejection for Japanese Application No. 2014-049917, dated Dec. 4, 2018.
Notice of Reasons for Rejection for Japanese Application No. 2014-049920, dated Oct. 23, 2018.
Notice of Reasons for Rejection for Japanese Application No. 2014-051597, dated Jul. 31, 2018.
Third Office Action for Chinese Application No. 201410098327.7, dated Sep. 30, 2018.
Zhu et al., "Localization Optimization Algorithm of Maximum Likelihood Estimation Based on Received Signal Strength," IEEE 9th International Conference on Communication Software and Networks (ICCSN), pp. 830-834 (2017).
Final Rejection for Japanese Application No. 2014-048410, dated May 29, 2018.
First Office Action for Chinese Application No. 201410097872.4, dated Aug. 23, 2017.
First Office Action for Chinese Application No. 201510049715.0, dated May 4, 2018.
Notice of Reasons for Rejection for Japanese Application No. 2014-048412, dated Feb. 27, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049917, dated Mar. 6, 2018.
Notice of Reasons for Rejection for Japanese Application No. 2014-049918, dated Apr. 10, 2018.
Notice of Reasons for Rejection for Japanese Application No. 2014-049920, dated Feb. 20, 2018.
Notice of Reasons for Rejection for Japanese Application No. 2014-051595, dated Jan. 16, 2018.
Notice of Reasons for Rejection for Japanese Application No. 2014-051596, dated Jan. 16, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097675.2, dated Feb. 11, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410097922.9, dated Jan. 9, 2018.
Second Office Action for Chinese Application No. 201410098327.7, dated Feb. 27, 2018.
Bassat et al., "Workflow Management Combined with Diagnostic and Repair Expert System Tools for Maintenance Operations," IEEE, pp. 367-375 (1993).
Search Report for Application No. GB1501042.4, dated Feb. 2, 2016.
Search Report for Application No. GB1517034.3, dated May 26, 2016.
Search Report for Application No. GB1517038.4, dated Mar. 22, 2016.
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emerging M&S Applications in Industry & Academia/Modeling and Humanities Symposium (2013).
First Office Action for Chinese Application No. 201410097675.2, dated May 10, 2017.
International Preliminary Report on Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).

\* cited by examiner

Create Rule

| | | |
|---|---|---|
| Domain: | OperatorInterface | ~91 |
| Symptom: | PC Sluggish | ~92 |
| Name: | Check display resolution | ~93 |
| Description: | Check for non-supported display resolution | ~94 |
| Action: | supported resolution 1024 x 768 | ~95 |
| KRA: | AC1000-10004 | ~96 |

\* Indicates required inputs

[Save] [Save & Open Rule Logic] [Cancel] ~97

FIG. 5

Rule's Results

Show [10 ▼] entries

Search: [    ]

| Node ▲▼ | Symptom ▲▼ | Rule Name ▲▼ | Detected Value ▲▼ | Expected Value ▲▼ | Action ▲▼ | KBA ▲▼ |
|---|---|---|---|---|---|---|
| ⊙ PPLUS | PC Sluggish | Check display resolution | Datetime=1/6/2016 12:09:23 PM, FracSec=5980, EventType=ALARM, EventSubType=, Category=HARDWARE, Area=AREA_A, Node=PROPLUS, Unit=, Module=PROPLUS, ModuleDescription=, Attribute=ADVISE_ALM, State=act/ack, EventLevel=07-ADVISORY, Desc1=ADVISE, Desc2=Event Chronicle: Disk Space Low, IsArchived=9, Ord=2035, IsSwitchedToSecondary=False, IsConnFailure=False | Event Chronicle: Disk Space Low string exists | supported resolution 1024 x 768 | AC1000-10004 |

Showing 1 to 1 of 1 entries

Previous [1] Next

[Close]

RULE BUILDER IN A PROCESS CONTROL NETWORK

RELATED APPLICATIONS

This application is related to U.S. Provisional Patent Application Ser. No. 61/798,820, entitled "Data Modeling Studio" which was filed on Mar. 15, 2013, the entire disclosure of which is hereby expressly incorporated by reference herein and is also related to U.S. patent application Ser. No. 13/784,041, entitled "Big Data in Process Control Systems" and filed on Mar. 7, 2013 and U.S. patent application Ser. No. 14/216,823 entitled "Data Modeling Studio," the entire disclosures of which are hereby expressly incorporated by reference herein.

TECHNICAL FIELD

The present patent relates generally to support systems for process plants and process control systems used within process plants, and more particularly, to the use of a diagnostic rule builder platform within a process plant support system to create rules that may be executed on various different types of data within or from process plants and/or process control systems to detect problems or issues within the process plants, such as issues within computer and communications systems implementing process plant control functionality.

BACKGROUND

Distributed process control systems, like those used in chemical, petroleum or other process plants, typically include one or more process controllers communicatively coupled to one or more field devices via analog, digital, or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc., to control one or more processes executing within the process plant or system. Smart field devices, such as the field devices conforming to the well-known FOUNDATION® Fieldbus protocol, may also perform control calculations, alarming functions, and other control functions commonly implemented within a process controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information, and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or at other locations away from the harsher plant environment. Each of these hardware devices typically is centralized across the process plant or across a portion of the process plant. These hardware devices run or execute various different applications that may, for example, enable an operator to perform functions with respect to controlling a process and/or operating the process plant, such as changing settings of the process control routines, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include wired communication paths, wireless communication paths, or a combination of wired and wireless communication paths.

As an example, the DeltaV™ control system, sold by Emerson Process Management, includes multiple different applications stored within and executed by different devices located at diverse or distributed places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may execute in a still further computer attached to the data highway to store the current process control routine configuration and data associated therewith. Alternatively, the configuration database may be located in the same workstation as the configuration application.

In any event, as will be evident from the above discussion, there are many supporting applications and systems that are implemented in or across the various computer devices within a process plant and process plant control system, such as various hardware and software diagnostic applications, control applications, configuration applications, computer operating system software and firmware applications, communication devices, network security devices, etc. Each of these various applications or components of a process plant control system may collect, generate, and store various different types of data in various different formats and at various different locations or databases within the plant. The applications may, for example, store basic or underlying computer settings or configuration settings, such as those associated with various computer hardware devices within the plant, and operating system software or firmware parameters used in various computers within the plant. Additionally, the applications may store basic communication and communication network settings, configuration data, or other data related to the manner in which electronic communications are set up in the plant using various different types of communication hardware and software implemented according different communication protocols used within the plant. Still further, other applications may generate and store data pertaining to the manner in which various process control software and process plant hardware and software diagnostic applications are set up or configured within the plant to perform various control, display, communication, calibration, diagnostic, security, and other actions within the plant. Needless to say, there can be very many applications or systems present within and executed within a plant environment, and each of these applications or systems may have various different types of data, configuration settings, etc. associated therewith.

Moreover, some newer process plant systems may include "big data" machines that collect some or all of the data generated within or about a process plant and generated by the various systems within the plant. "Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications, and retail applications may use and manipulate big data. Big data may be supported by a distributed database that allows the parallel processing capability of modern multi-process, multi-core servers to be fully utilized. As noted above, there has been some recent developments towards incorporating big data or big data machines within a process control system for the purpose of archiving process control data at a level that has not been available in the past. However, there is currently no or only very limited ability to analyze or use this data, as collected from a process plant or a process, to perform comprehensive or systematic analysis of the plant operation, to be able to detect trends, perform predictive analysis, detect abnormalities within the plant operation, retune or reconfigure the plant to operate more economically, etc.

Thus, as will be understood, while various different process plant or process control systems associated with different process plants or plant locations may use the same basic computer hardware, communications networks, process control and diagnostic software systems, and other supporting applications, each plant may be set up and configured differently during operation, thereby making, in essence, each plant or even sub-portions of the same plant, a unique computer system that is configured and operated in a unique manner. There are many, many factors that go into setting up or configuring a plant control and communication network, including control settings, configuration settings, hardware connections, computer operating system software and versions thereof, computer hardware and software updates that may or may not have been installed in the plant, identities of and locations of databases and other hardware within the plant, firewall or other security settings, etc. Moreover, plant operators may make mistakes in setting up or configuring the plant hardware and software systems. In most cases plant operators, and in some cases even plant information technology (IT) personnel, do not completely understand the underlying configuration and structure of a plant network (including, for example, plant computer and communication networks), and thus these individuals are generally unable to detect the source of all errors or problems that may occur within a plant system, much less to fix the errors when running the plant networks or systems. To assist plant personnel in maintaining and operating these complex process control systems within a plant, process control system software providers generally provide technical assistance to users of the process control system software to assist the users (customers) in trouble shooting computer and network issues and in applying fixes for detected problems.

However, troubleshooting customers' issues may be a time consuming task, as this troubleshooting usually involves collecting diagnostic data from the customer computer systems and then analyzing the collected data in a manual manner to detect abnormalities, improper settings, etc. Some issues are difficult to troubleshoot, which may involve escalation of the issue up to technology experts who actually dig into the source code of the control and network software to determine the root cause of the issue. On the other hand, some issues are very easy to troubleshoot because they are known issues that have occurred in different customers' systems in the past, and these information pertaining to these issues may have been documented and stored in a known location or manner for use in later troubleshooting and problem solving. Generally, in some systems, the detected issues and the solutions thereto are stored in a Knowledge Base Article (KBA) which may then be accessed by IT personnel who run across the same or similar issue in a customer's system.

Generally, the process of troubleshooting and providing a solution to a customer's issue using current troubleshooting support systems involves collecting data from the customer's site as specified by a local engineer, a product engineer (PE) or someone else at a global service center (GSC), and then having the global service center (GSC) personnel (such as a product engineer or a local engineer) review the collected data to determine if the customer's symptoms/issues are known and listed in a previously stored KBA. For experienced or senior engineers, this process can be a straight-forward task because these experienced engineers have performed this analysis many times. For example, the experienced engineers may know exactly which log file (of a number of data files collected from a customer site) to open, what keywords/tokens to look for in the log files, etc., in order to solve or detect the source of a problem or issue.

On contrary, however, newly hired or junior level engineers may require a longer time to analyze data to assist in correcting issues, even if the issues are known issues, and especially if the issues are new ones (i.e., ones not associated with any stored KBAs). This manual approach is also not scalable, as the number of experienced or senior engineers is not always proportional to the number of new or junior engineers.

To make things easier, a more automated process has been developed to assist in detecting and solving customer site support issues. In particular, this automated process applies previously created analytic rules to the data files collected from a customer's site, and uses these rules to generate analytic results which point to or identify one or more KBAs which may assist in understanding or solving a problem. These rules may be run automatically on any new set of customer data to assist the engineers at the support center in diagnosing network and process control system issues at a customer site. However, this automated process is an ever-green process that requires adding more analytic rules to solve more issues. Unfortunately, generating new analytic rules within this automated process generally requires the involvement of a development team that understands how to create and to code the new analytic rules in a manner that can be used by the analysis engine associated with the automated process.

In particular, a current analytic support system in use involves an engineer at the service center submitting diagnostic data collected from a customer plant to one or more analytic engines, which then analyze the collected data by applying a set of finite analytic rules to the data, looking for known issues. After running the analytic rules, the analytic engine produces a list of analytic results which indicates any issues found, based on the analytic rules used in the analytic engine, and provides one or more possible resolutions to the problem, which resolutions are specified by the analytic rules run within the analytic engine. However, in this system, only a developer can add more analytic rules to the analytic engine. In particular, to develop the analytic rules, a support system engineer writes down the manual troubleshooting steps that she or he usually performs, and then submits this log in writing to a development team. A rule developer then uses these manual troubleshooting steps to write computer code that automates the manual troubleshooting steps as performed by the local engineer to form one or more new analytic rules. The developer then tests and publishes the new analytic rules to the analytic engine, which thereafter uses these new rules to analyze customer data. However, the new rules must be manually created by a highly specialized or expert developer who has knowledge of the analytic engine and who is able to program new rules in the language and format that will work within the analytic engine. Moreover, the process of developing new rules is time consuming, and can result in a significant delay between the time when a particular issue occurs (for the first time) and the time at which a rule that detects and provides a solution for that issue is created and provided to the analytic engine to detect the same issue in other customer locations at later times.

SUMMARY

An analytic rule builder system or application is provided for and is integrated into an electronic customer technical support system that enables those using the customer technical support system to build his or her own custom analytic rules, on demand, for use in diagnosing and detecting issues at a customer process plant site, without having to submit a request to a developer and wait for one or more new rules to be provided in future releases of the customer technical support system. The analytic rule builder can also be used by local offices and local technology groups, if need be, or can be used by personnel at customer sites. The custom analytic rules can be shared among engineers using the electronic customer technical support system to empower local engineers or users to generate and immediately use new rules. Moreover, rules created in a distributed manner by local groups or users can be provided to a centralized system for distribution to other users, and can be used to enable developers to understand what analytic rules are being created by local users. Still further, the analytic rule builder can be used in an online support system where on-site engineers build one or more custom analytic rules to monitor certain data stream or events within the plant control system and use the rules to trigger some actions within the plant, upon the detection of the events, such as setting alarms, collecting and analyzing additional data, etc.

In one embodiment, a rule builder application provides a structured environment for graphically creating or programming new analytic rules which, for example, may be configured to use or analyze data from any of many different computer systems and applications within a process plant, including for example, computer hardware and network configuration applications, plant asset configuration and control applications, process plant control or diagnostic systems, etc. Moreover, the data used in the rules may include data collected in any manner, such as by data historians, user interfaces, workstations, controllers, input/output devices, field devices, a big data machine, etc., as located within a plant, all for the purpose of enabling the analytic rules to perform more systematic or comprehensive diagnoses, prognoses, analyses, etc. when monitoring a process plant.

The rule builder application may include a configuration routine or engine for generating user interface elements to facilitate graphical construction or programming of a new analytic rule, and may include a runtime engine for executing the analytic rules to perform analysis of or with respect to data within a process or a process plant, including for example, process plant computer and communication network data, hardware configuration data, etc. In some cases, the configuration engine may include an interface routine that displays various components or tools on a display device to be used in building an analytic rule, including for example, indications of data sources (e.g., sources of input data to be used in a rule), logic or flow control operations to be used in a rule, and output actions that may occur as a result of the implementation of a rule or the detection of an issue by the rule. The configuration engine may also include a rule or logic compiler that converts the displayed rule into a software format executable by a runtime engine (e.g., an analytic engine). The runtime engine may include a data retrieval routine for retrieving data used in executing a rule, and a rule execution routine that runs or executes the executable analytic rules.

In some cases, the interface routine may include instructions stored in memory that when, executed on a processor, generate a toolbox region on a user display that displays one or more sources of various data, one or more sets of control flow or logic operations, and one or more output actions, and that generates a workflow region on the user display. During use, a user can navigate through the data sources (or a data source hierarchy) displayed in the toolbox region to locate or define specific input data to be used in an analytic rule and can drag one or more input data sources to the workflow region. More particularly, the data hierarchy region may display input data indicators or other indications of data available from various different computer systems or applications within a plant. Such a data source hierarchy may come from or may be populated by a plant configuration system or a plant configuration database that stores data defining the types of data generated within a plant, the applications that generate or store data within a plant, and the format and/or structure of that data as stored within a plant. Still further, the toolbox region may include indications of various logic or control flow operations that can be used in an analytic rule. Here, the user can use or select ones of the set of control flow or logic operations and drag these operations to the workflow area to define one or more logical operations to be applied to the selected input data in one or more rules and to define the order or sequence of these operations. Likewise, the toolbox region may include indications of one or more output actions, and the user may select one or more of these output operations within the toolbox region of the display screen and drop these output actions in the workflow area to define the actions taken by a rule in response to the logical determinations made by the logic or control flow operations of the analytic rule. Such output operations may specify one or more actions to be taken when a logic operation or determination is made, and the output operations may include actions such as display actions, alarming actions, physical operations or physical actions in the plant, etc.

Thus, in one embodiment, to enable a user to graphically create a rule, the user interface routine may create a canvas or workflow region on a user interface or display that serves as a main presentation window for graphically creating and illustrating rules being created, and the interface routine may also generate an outline area that displays an outline or summary of the rule being created. Generally, any user may use the configuration routine of the rule builder application to graphically arrange the sub-elements (data inputs, control flow logic, and output actions) of an analytic rule within the workflow region, to thereby define the manner in which the logic of the rule will operate on input data (as specified in the rule) to create output actions indicative of or indicating the need for some action(s) within the plant.

The rule configuration engine may also include a compiler routine stored in a memory and executable on a processor to transform the graphical representation of the rule, as created by the user using the user interface routine, into a compiled rule, that is, into an executable format supported by an analytic engine. The compiled rule may be tested in an on-line analytic engine on specified data files to determine whether the rule operates correctly or as desired. When finished, the user may save the compiled rule as a new rule in memory and, thereafter, the rule may be run or executed by an off-line analytic engine, or by a runtime analytic engine within the plant environment to analyze data from the plant, to thereby detect and diagnosis issues in the plant.

In some cases, the user may create a rule, and may then run this rule on historical data as stored within a big data machine (or other historical database) to determine if the rule operates appropriately for its intended purpose. If not, the user may alter or change the rule by, for example, incorporating additional logic or input/output data within the rule, and may then rerun the altered rule on the same set of historical data (or data from the same source or sources), to thereby test the altered rule. When the rule builder application is connected to a process plant that has a big data machine that collects all or most of the data generated in or detected within a process, the data associated with the new parameters used in the altered rule are immediately available in the big data historical database, as this data was collected as part of the big data architecture of the process. In this manner, a rule creator can quickly or more easily design, test, change, and retest rules on historical data prior to placing these rules into operation within an on-line plant environment or an off-line customer technical support system.

The user may thus use the configuration engine to graphically create and compile a rule for determining improper computer or communication network settings, configurations, etc., for detecting faults with plant equipment, for detecting faults within the operation of the plant, for analyzing the operation of the plant, for diagnosing a current problem within a plant, for predicting potential future problems within the plant, for identifying relationships within plant data and plant equipment, etc. The rule builder application as described herein thus provides a robust and efficient architecture for graphically creating and executing logic rules in a process plant support system as well as within a process plant computer and communication network environment.

In another embodiment, a computer system for facilitating graphical construction of an analytic rule for use in analyzing data from a process plant includes a non-transitory computer readable memory that stores a plurality of rule component templates, including one or more data source templates defining data sources within the process plant, one or more functional templates defining logic determination operations to be performed using data from the process plant, and one or more output templates indicating actions to be performed in response to a logic determination operation. The computer system also includes a configuration engine that operates on a computer processing device and that further includes an interface routine that generates, via a user interface device, a library region that displays graphical depictions of the rule component templates, including one or more data source templates, one or more functional templates, and one or more output templates, and a workflow region that receives and displays rule components based on user selections of the graphical depictions of one or more rule component templates, the rule components including at least one data source component, one functional component, and one output component. The configuration engine operates to execute a graphical input routine to display an interactive window for each of a set of rule components derived from the rule component templates, wherein the interactive window for each of the rule components enables a user to define one or more specific parameters of each of the rule components. In particular, the graphical input routine displays, for the data source component, a data input interactive window including one or more user-definable parameters specifying a specific set of data from a specific data source to be retrieved for the analytic rule. Moreover, the graphical input routine displays, for the functional component, one or more functional interactive windows including one or more user-definable parameters specifying one or more logical operations to be performed using the specific set of data from the specific data source. Still further, the graphical input routine displays, for the output component, an output interactive window including user-definable parameters specifying an action to be taken associated with a determination made by the one or more logical operations.

The computer system also includes a compiler that executes on a processor to compile the rule components, including the user-defined parameters of each of the rule components, into an executable analytic rule, and includes a runtime engine that executes on a computer processing device to execute the executable analytic rule.

If desired, the non-transitory computer readable memory may store a set of metadata for each of the plurality of data source templates, the metadata for each of the data source templates defining a structure of the data from a data source. The metadata may, for example, define a structure of the data as stored in a data file obtained from the data source associated with a data source template. The user-definable parameters of the input data component may include an indication of one or more parameters defined in the metadata for a data source, such as an indication of a row and a key of data as stored in a database format, a variable name for the data value of the data referenced by the data source component, and/or a mathematical operation to be applied to a data value referenced by the data source component.

Still further, the user-definable parameters of the functional component may include an indication of a variable name of data to be used in one of the one or more logical operations, an indication of a logical condition to be tested with respect to data specified by the variable name, and/or an indication of an order of execution of one or more logical operations.

The user-definable parameters of the output component may include an indication of information to be provided as part of an output display, such as an indication of a knowledge base article stored in a database, which knowledge base article stores information related to correcting a detected issue, an indication of an electronic communication (such as an e-mail, an alarm, a control signal, etc.) to initiate in response to a determination made by a logical operation specified by a functional component, and/or an indication of a message to be provided to a user interface within or associated with a process plant.

Still further, the data source templates may generally define any one or more of a server/workstation hardware data source, an operating system data source, a process controller data source, a batch data source, a network communication/infrastructure data source, an operator interface data source, a database data source, a software and application data source, a safety instrumented systems data source, an OPC simplex or redundant/mirrored sever data source, a logbook data source or a virtualization data source, all as generated in or stored in various process control systems and support systems of a process plant.

The runtime engine may include an execution engine that executes the executable analytic rule and a data retriever that retrieves data from a data file stored in a database for a particular process plant site as specified by the data source component. The computer system may further include a database that stores a plurality of sets of customer data files, each of the plurality of sets of customer data files being associated with a different customer process plant site or with a different collection time at the same customer process plant site, and the runtime engine may execute the executable analytic rule using data from a specified one of the plurality of sets of customer data files. In some cases, the runtime engine may include a user interactive component, such as a pop-up window, that enables a user to specify the one of the plurality of sets of customer data files to use.

Still further, the computer system may include a publisher routine that executes on a processor to publish the executable analytic rule to a rule database for use by other users. The interface routine may further generate, via the user interface device, an outline region that displays a summary of the analytic rule displayed in the workflow region.

In another embodiment, a computer implemented method of facilitating graphical construction of an analytic rule includes storing, on a non-transitory computer readable memory, a plurality of rule component templates, including one or more data source templates defining data sources within a process plant, one or more functional templates defining logic determination operations to be performed using data from the process plant, and one or more output templates indicating actions to be performed in response to a logic determination operation. The method also includes generating, on a user interface device, using a computer processing device, a library region that displays graphical depictions of the rule component templates, including one or more data source templates, one or more functional templates, and one or more output templates, and a workflow region that receives and displays rule components based on user selections of the graphical depictions of one or more rule component templates, the rule components including at least one data source component, one functional component, and one output component. Still further, the method includes generating, in the workflow region on the user interface device, using a computer processing device, an interactive window for each of a set of rule components derived from the rule component templates in response to a selection by a user of each of the set of rule component templates, and using the interactive window for each of the rule components to enable a user to define specific parameters of each of the rule components. In particular, the method may use, for the data source component, a data input interactive window including one or more user-definable parameters specifying a specific set of data from a specific data source to be retrieved for the analytic rule. Likewise, the method may use, for the functional component, one or more functional interactive windows including one or more user-definable parameters specifying one or more logical operations to be performed using the specific set of data from the specific data source. Still further, the method may use, for the output component, an output interactive window including user-definable parameters specifying an action to be taken associated with a determination made by the one or more logical operations.

Likewise, the method includes compiling, on a computer processor device, the rule components, including the user-defined parameters of each of the rule components, into an executable analytic rule, and executing, on a computer processing device, the executable analytic rule.

In yet another embodiment, a computer system for facilitating graphical construction of an analytic rule for use in analyzing data on-line in a process plant having process plant equipment that produces or stores on-line data, includes a non-transitory computer readable memory that stores a plurality of rule component templates, including one or more data source templates defining data sources associated with the process plant equipment within the process plant, one or more functional templates defining logic determination operations to be performed using data from the process plant, and one or more output templates indicating actions to be performed in response to a logic determination operation. The computer system also includes a configuration engine that operates on a computer processing device, and that further includes an interface routine that generates, via a user interface device, a library region that displays graphical depictions of the rule component templates, including one or more data source templates, one or more functional templates, and one or more output templates, and a workflow region that receives and displays rule components based on user selections of the graphical depictions of one or more of the rule component templates, the rule components including at least one data source component, one functional component, and one output component.

Here, the configuration engine may operate to execute a graphical input routine to display an interactive window for each of a set of rule components derived from the rule component templates, wherein the interactive window for each of the rule components enables a user to define specific parameters of each of the rule components. For example, the graphical input routine may display, for the data source component, a data input interactive window including one or more user-definable parameters specifying a specific set of data from a specific data source to be retrieved for the analytic rule. Likewise, the graphical input routine may display, for the functional component, one or more functional interactive windows including one or more user-definable parameters specifying one or more logical operations to be performed using the specific set of data from the specific data source. Moreover, the graphical input routine may display, for the output component, an output interactive window including user-definable parameters specifying an action to be taken associated with a determination made by the one or more logical operations.

Still further, the computer system may include a compiler that executes on a processor to compile the rule components including the user-defined parameters of each of the rule components into an executable analytic rule, and may include a runtime engine coupled to the process plant equipment that executes on a computer processing device to execute the executable analytic rule to analyze on-line data from the process plant. In some cases, the user-definable parameters of the output component may include an indication of one or more electronic communications within a process plant control system to initiate (such as an alarm, a control signal, a safety shut down signal, etc.) in response to a determination made by a logical operation specified by a functional component, and/or may include an indication of a message to be provided to a process control operator associated with the process plant. Moreover, one of the data source templates may reference a data stream from a process control system of the process plant, data related to process controller events within the process plant, or data related to user workstation events within the process plant.

BRIEF DESCRIPTION OF THE DRAWINGS

FIG. 5 depicts an example screen presentation that may be generated by a rule builder application to define aspects of a new analytic rule.

FIG. 10 depicts an example display produced as an output of a rule defined using a rule builder application.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

Figure 1:
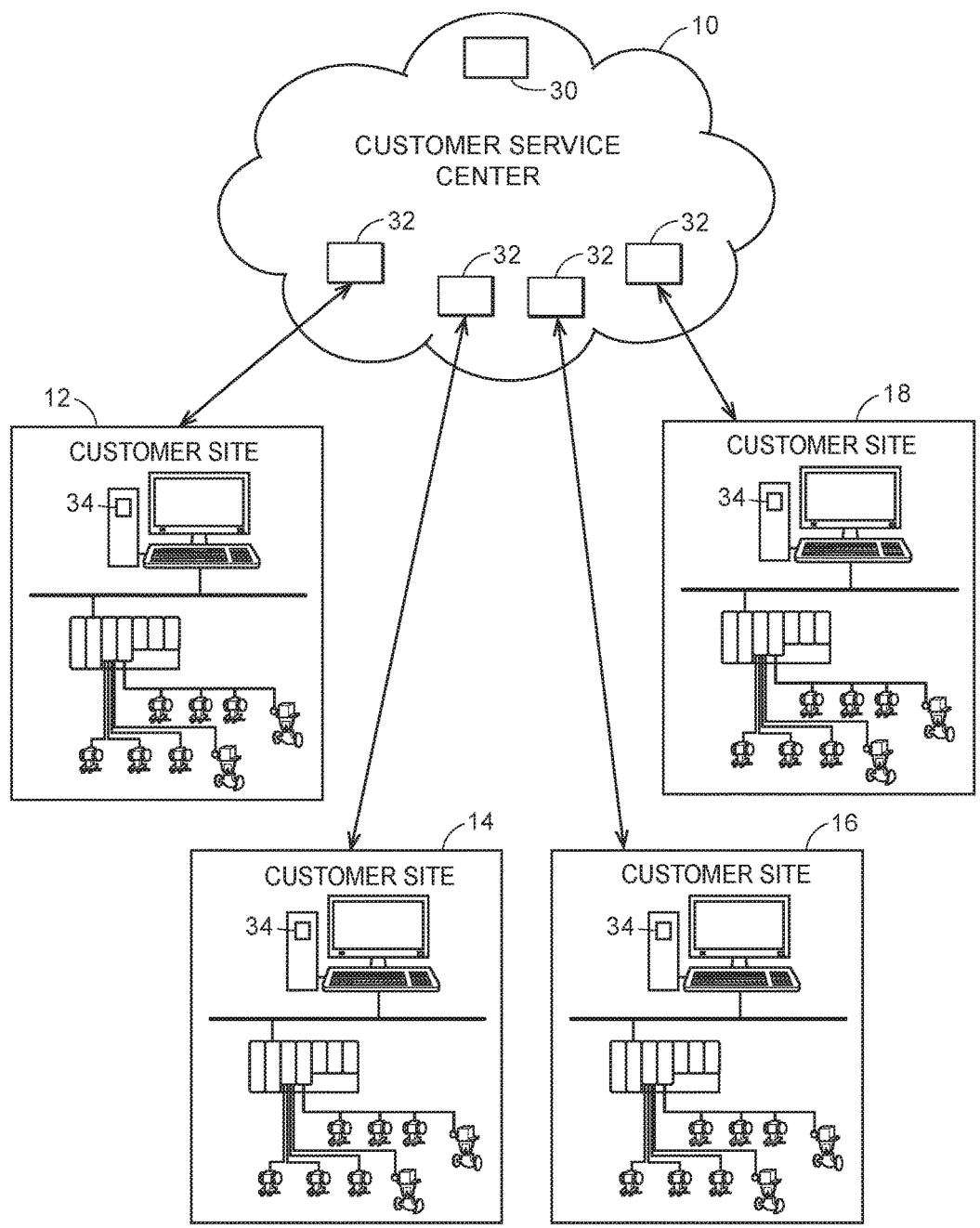
FIG. 1 is a block diagram of an example process plant technical support system communicatively connected to numerous customer process plant sites.

FIG. 1 illustrates a customer technical service or support center 10 connected to various customer sites or locations 12, 14, 16 and 18 via data network communication connections, which for example, may be Internet connections, local area network (LAN) lines, wide area network (WAN) lines, hardwired or wireless communication connections, and/or any other type of data or communication connections. Each of the customer sites 12-18 includes or is associated with a different process plant or with different areas or parts of a process plant, and each site 12-18 is illustrated as including a process control network 20 therein having various process control devices, such as controllers, input/output devices, field devices, data historians, user workstations and interfaces, etc., used to control and monitor plant equipment. The process plants at the customer sites 12-18 may include any number of operator workstations, host workstations, databases, and other process plant equipment associated with a typical process control network, or process control system, and these devices may store and execute any number of different process plant control, monitoring, and support applications.

Of course, each of the process control networks 20 within the plants at the customer sites 12-18 can be configured with different equipment, have different numbers and types of controllers, field devices, and other plant equipment, may be set up to control different types of processes or plant equipment, may run different control and support applications, may use different operating systems or versions of operating systems, etc. Still further, each of the customer sites 12-18 may include one or more computers and communication network devices connecting the various process control devices together, and the plants at the customer sites 12-18 may provide the same or different types of user and operator support hardware, firmware, and software applications. As will be understood, each of the process control networks 20 and the computer systems supporting those process control networks 20 run various process control network and operating system software, as well as other computer implemented applications that have various data associated therewith. In particular, in many cases, the process control networks 20 have data historians or other databases that collect and store data associated with the plant, including configuration data, runtime data, computer network setting data, communication network data, error data, support application data, etc., generated within the plant. Likewise, the computer systems within these plants include operating system software, communication network configuration software, etc., which may generate and store data in any number of different manners and/or formats.

The customer technical support center 10, on the other hand, includes various computer and processing devices, which are used to provide support for troubleshooting issues or assisting customers at the customer sites 12-18 to diagnose issues or problems associated with the process plants 20 at the customer sites 12-18. As an example, the customer technical support center 10 may include one or more computer support systems (computer systems) 30, as well as one or more databases 32, which operate to obtain and analyze data from each of the customer sites 12-18 for the purpose of providing assistance in detecting and diagnosing issues in the plants or process control systems at the customer sites 12-18. Generally speaking, the computer support systems 30 may include any number of computers or other processing devices, including workstations, servers, analytic engines, etc., which use data collected from the various customer sites 12-18 (which data may be stored in various data files, also referred to herein as customer data files, stored in the databases 32). It will be noted that data collector applications 34 may be located at each of the customer sites 12-18, and in particular, may reside within one or more processing devices at the customer sites 12-18, may execute on the processors at the customer sites 12-18 to collect data from the various applications being run at the customer sites 12-18, and may operate to send this data to the customer technical support center 10. In some cases, the customers may execute the data collector applications 34 at desired times, upon request by the support center 10, or even periodically, to collect various data files from the various applications, operating systems, hardware systems, etc. at the customer sites. The customers may then upload the output of the data collector applications 34 as a zip file using a third party website for security purposes. Personnel at the service center 10 may then download the zip files from the third party website, may unpack the downloaded zip files (to obtain the various customer data files for a particular collection), and may store these data files in the databases 32 as being associated with a particular customer at a particular time or download. In other cases, the computer support systems 30 may include communication and control applications which execute periodically or on demand to communicate directly with the data collector applications 34 or via a third party or other website with the data collector applications 34 to cause the data collector applications 34 to collect new data from the plants 20 at the customer sites 12-18. The collected data may be placed into various different data files associated with different applications and other data sources within the plants 20, and these data files may be stored together as a set of customer data from a particular customer site (at a particular time). This data be generated by or associated with the operating control networks and applications, as well as with the computer and operating systems associated with or used by the plant networks, at the customer sites 12-18.

Generally speaking, each of the data collectors 34 is stored in and executed within a computer at a customer site 12-18 or in some cases may even be stored in and executed within computers (e.g., servers) at the customer technical support center 10. Moreover, the data collectors 34 operate to connect with the other computers or electronic devices within the customer sites 12-18 to collect particular types of data and to place this data into predefined files, which are then sent to and/or stored within the databases 32 at the customer technical support center 10. The data collectors 34 may be set up to collect data periodically, on demand, and/or at predetermined times, and may be configured differently for each of the customer sites 12-18, to collect different data associated with the hardware and software applications present at the customer sites 12-18. The data collectors 34 may operate to access and collect specifically configured data, to collect various different types of data depending on the customer sites, assets, and software applications at those sites, etc. and may collect data in different formats, file structures, database structures, etc. Thus, the different data collectors 34 may collect different types of data associated with different user or customer applications and assets for each of the customer sites 12-18. Generally speaking, the data collectors 34 will collect process control type data (including, for example, configuration and operational data), computer hardware data, including workstation and server configuration data, communication network configuration data, user interface data, operating system data, or any other types of data, such as metadata stored about or for computers or other devices at the customer sites 12-18. Such data may include, for example, descriptions or indications of the settings of the computers or networks at the customer sites 12-18 (such as display resolution settings, display settings, network settings, port settings, etc.). Moreover, each of the different types of data may be stored in different data files in the same or different data formats, with the formats generally being dependent on the type of data, the application or system that generates the data, etc.

In any event, the data collectors 34 periodically, or at various times as configured by users at the customer site 12-18 or otherwise, collect and provide data files with the customer data to the databases 32, for use by one or more analytic engines implemented by the computer systems 30 at the customer technical support center 10. More particularly the computer system 30 may store and execute one or more analytic engines that use pre-stored analytic rules to analyze the collected data in the customer data files to detect issues associated with the customer system or plants 20 at the customer sites 12-18. If desired, the analytic engines at the center 10 may use the stored analytic rules to automatically analyze customer data upon receiving each new customer data file or set of customer data files, so as to automatically and periodically review the customer sites for known issues or problems. Additionally, the customer services center 10 may include one or more standalone computers or engineer interfaces (e.g., workstations), which may be set up to help solve specific problems associated with various ones of the customer sites 12-18. In particular, these workstations may be used by local engineers, who may interface with customers who are having a particular problem, to help customers solve new problems or issues that were not detected by the operation of the analytic engines using the set of pre-stored analytic rules. In these cases, the engineer may cause a data collector 34 to collect data of one or more particular types, or to collect a new set of data from the customer site, and the local engineer may implement a manual review of this data to analyze that data. In some cases, the local engineer may use one or more analytic rules to analyze the data, and these rules may be rules stored in and used by the analytic engines, or may be new rules created by or available to the local engineer.

In order to make the generation, creation, and use of the analytic rules that are available within and that are executed by computers at the customer technical support center 10 more transparent and easier, the customer technical support center 30 may include one or more rule builder applications, which enable local engineers or other users to graphically create and test new analytic rules as new customer support situations or issues arise. Moreover, the rule builder applications may enable the local engineers to upload or to promote newly created analytic rules, if desired, for use by other engineers (either at the same customer technical support center 10 or at other technical support centers). The rule builder applications may also enable new analytic rules to be used by the analytic servers at the same or different customer technical support centers, so as to be automatically applied to various customer data files, as these files are collected or become available at the center 30.

Figure 2:
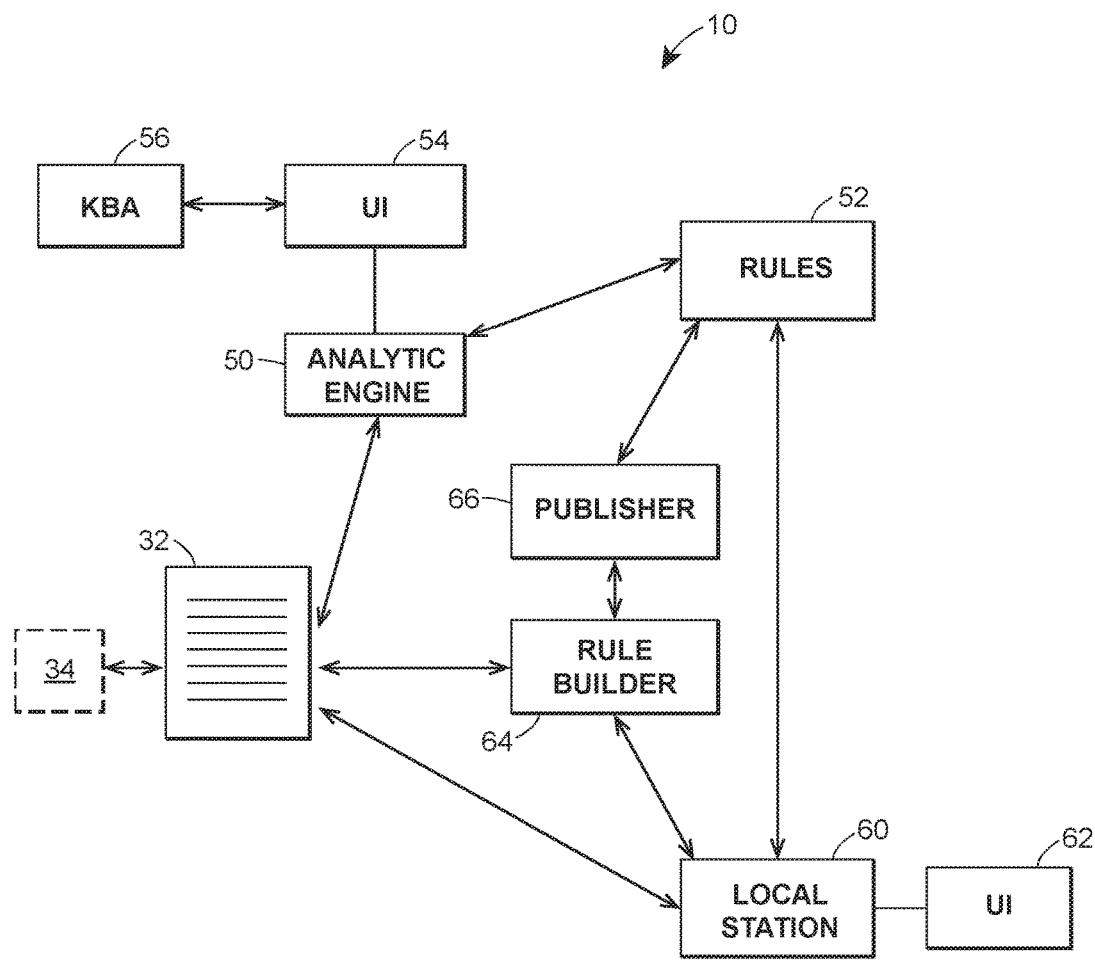
FIG. 2 is a block diagram of an example process plant technical support system having a rule builder application integrated therein.

FIG. 2 illustrates a more detailed block diagram of an example customer technical support center 10 such as that of FIG. 1. In particular, the customer technical support center 10 of FIG. 2 includes one or more databases 32 that receive and store various customer data files (e.g., various sets of customer data files) as collected from the customer sites 12-18 of FIG. 1. Furthermore, the customer technical support center 10 includes an analytic engine 50, a set of analytic rules stored in a rules database 52, and a user interface 54. These components 50, 52, and 54 may be implemented in, for example, one or more workstations or other computer processing devices at the center 10. Moreover, the user interface device 54 may be used by engineers or other personnel to manage the operation of the analytic engine 50 to, for example, run the analytic engine 50 on various customer data files using the analytic rules in the rules database 52, and to review the outputs of the analytic engine 50 when the analytic engine 50 uses the analytic rules stored in the rules database 52 to analyze customer data files (as stored in or available from the database 32). In one example, the analytic engine 50 may operate each time a new set of customer data files comes in or is stored within the database 32, and in doing so may apply each of the analytic rules or specifically configured subsets of the analytic rules stored within the rules database 52 to analyze the data within the customer data files in order to detect known problems or issues. The analytic engine 50 may then indicate detected issues or problems on or at the user interface 54.

Generally speaking, the analytic rules in the rules database 52 are logic rules that have been created and stored to be used to analyze the customer data files in order to spot specific issues or problems at customer sites, and to assist local engineers or other support personnel at the technical support center 10 to diagnose or detect specific problems at the customer sites. Such problems may be displayed via the user interface 54 as a set of warnings, detected issues, etc., and each of those detected issues may be associated with a knowledge base article (KBA) stored in a knowledge base article database 56. Each KBA may define or be associated with a problem or issue, and may provide potential solutions, fixes, or workarounds associated with the detected problem. Such KBAs may be stored in the database 56 or at any other location accessible via the user interface 54. The KBAs in the database 56 may be used to provide information to local engineers and to customers so as to inform the customers how to fix or correct issues that have been detected in their plants based on the analysis of their data.

Still further, the customer technical support center 10 may include a local engineering station 60 which may be used by, for example, a local engineer or any other support personnel to perform more detailed and involved analyses of the customer data files as stored in database 32, or to assist in solving particular issues for which no analytic rules have been created to detect based on the data within the customer data files. The local engineering station 60 may be a workstation or other computer processing device and may include a computer processor and a memory connected to a user interface 62. The local station 60 may have access to the customer data files 32 within the database or file server 32 and to the various analytic rules within the rules database 52. During operation, a local engineer or other user may use the station 60 to collect data from the data files 32 and/or to actually obtain new data from the customer site via the file server 32 and the data collector or data collectors (not shown in FIG. 2) within the customer sites 12-18, in order to obtain data to analyze. The local engineer at the local station 60 may manually analyze that data to detect problems associated with new issues or issues that have not been previously identified by the analytic engine 50 using the analytic rules stored in the rule database 52. Moreover, the local engineer at the station 60 may execute a local analytic engine to run one or more of the various analytic rules stored in the rules database 52 or other analytic rules stored locally at, for example, the station 60, if desired, to diagnose and detect new problems or new issues with the customer site. As part of this process, the local engineer may actually detect or determine that a new analytic rule can or should be created to detect a particular issue in the future and, in these situations, may use a rule builder application 64, as illustrated in FIG. 2, to create such an analytic rule.

Generally speaking, the local engineer may use the rule builder application 64 to graphically create a new analytic rule by determining or specifying data associated with a set of customer data files 32 to be used in the rule, flow logic or logical statements (operations) to be used in the analytic rule, as well as one or more output actions associated with the analytic rule, such as the display of a pointer to one of the KBAs stored in the KBA database 56, or some other action to be taken in response to detection of an issue based on the new analytic rule. In some cases, the local engineer may create and store a new KBA in the KBA database 56 associated with such a new analytic rule. As will be understood, the rule builder application 64 may allow a user to interactively and graphically create a new analytic rule and to test the analytic rule on-line using data from one or more of the customer data files in the database 32, in order to test the operation of the new analytic rule and make sure that the new analytic rule works for its desired or intended purpose.

After creating a new analytic rule and determining that the new analytic rule may be beneficial for use by other support personnel, or for use in the analytic engine 50 for analyzing other customer data, the local engineer may cause the rule builder application 64 to provide a new analytic rule to a publisher application 66, which then operates to publish the rule into the rule database 52 for use by the analytic engine 50 or other support personnel whenever needed. A newly published analytic rule can be made accessible to other local engineers via the general rules database 52 for use in diagnosing issues for other customers, for example, in any desired manner. Moreover, providing published analytic rules to other users may include providing those analytic rules to users at other support centers via a wired and/or wireless communication network or providing new analytic rules to users at customer sites.

Figure 3:
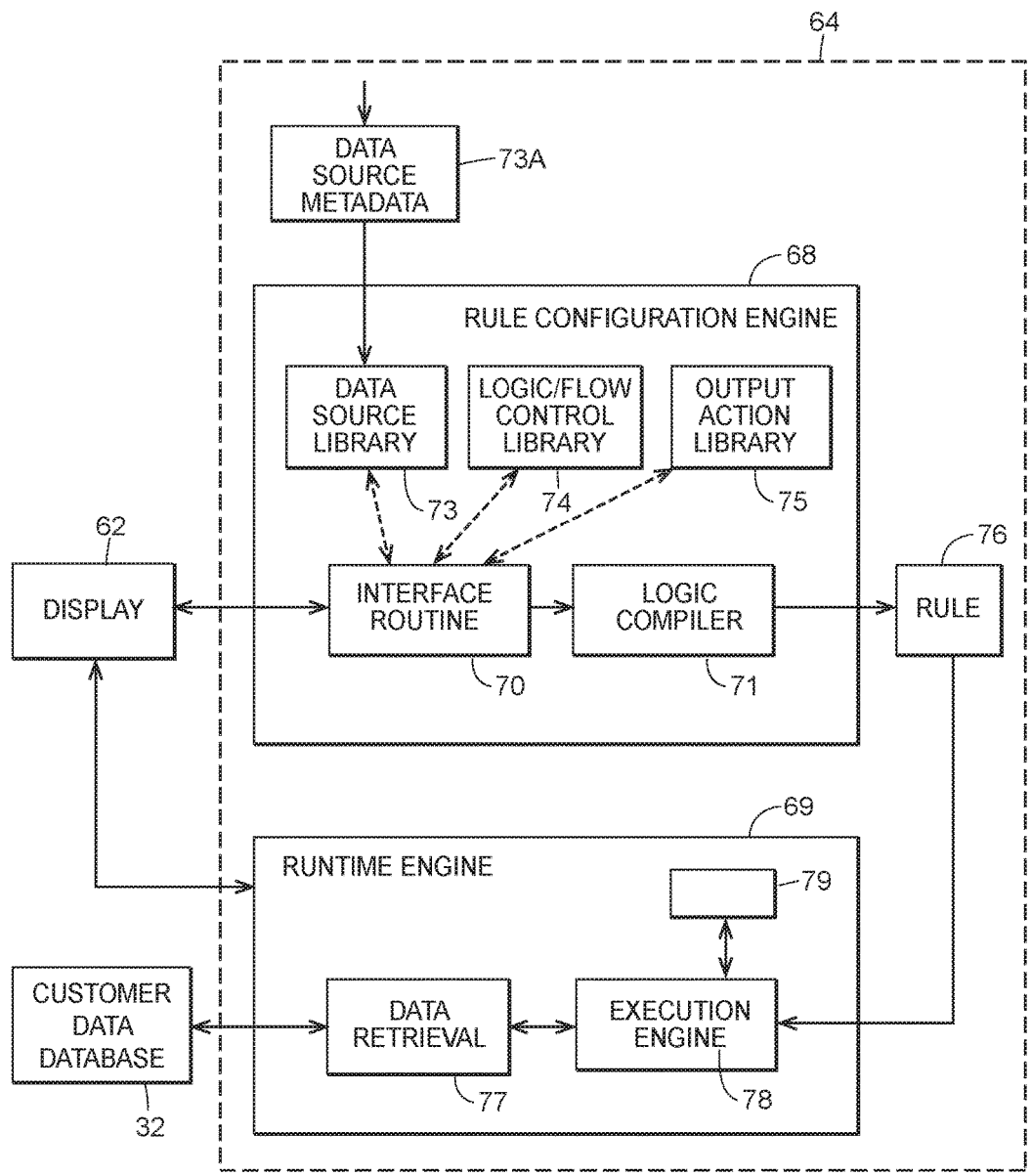
FIG. 3 depicts a block diagram of an embodiment of the rule builder application of FIG. 2.

FIG. 3 illustrates a block diagram of an example embodiment of the rule builder application 64 of FIG. 2. In this example, the rule builder application 64 includes a rule configuration engine 68, for use in creating new rules, and a runtime engine 69, for use in testing new rules as they are being created. Generally speaking, the configuration engine 68 is an application stored in a memory of a computer for execution on a processor of a computer that executes to provide a graphical display and programming environment to a user via a user display (illustrated as the user display 62 of FIG. 2) to enable a user to easily create one or more analytic rules. The configuration engine 68 may also be coupled to the customer data file database 32 which stores customer data files, and may operate using those data files and the file format or file structure information associated with those data files in creating a new analytic rule. More particularly, the configuration engine 68 of FIG. 3 includes an interface routine 70 and a rules compiler engine 72, as well as a set of template files or library files 73-75 storing various templates or known rule elements for use in creating new analytic rules. In particular, the library files 73-75 may include a set of data source pointer and structure files 73, a set of logic or flow control operations 74, and a set of output actions 75.

The interface routine 70 interacts with and controls the operations of the user interface implemented on the display 62 (which includes other user interface components like a mouse, a keyboard, a touch screen input, audio or sound making equipment, etc.) to provide an interactive graphical display environment to a user, such as a local engineer at the local engineering station 60 of FIG. 2, to enable the user to easily graphically create a new analytic rule. Generally speaking, the interface routine 70 displays a rule building programming environment on a user display and allows a user to take actions on or via the display (such as dragging and dropping components on the display at various locations, selecting items on the display, typing in or otherwise filling in information on the display, etc.), to create a rule. The user interface routine 70 recognizes and tracks the information input by the user via the display device to recognize and identify the various components of a new analytic rule being created.

As part of this process, the interface routine component 70 uses the libraries of rule components 73-75 to enable a user to specify the various components of an analytic rule. In particular, the data source library 73 may be used to enable a user to view, browse, and specify particular data and/or types of data to be accessed and analyzed as inputs to a new rule (e.g., to specify one or more pointers to particular data within one or more customer data files 32). Generally speaking, a separate data tool component or template may exist within the data source pointer library 73 for every type or source of data, for example, for the various different applications, networks, computers, computer systems, operating systems, etc., for which data is collected at a customer's site. Moreover, the library templates 73 associated with each data pointer may store (or be able to obtain from a customer data file) metadata for each data source, the metadata defining the characteristics of the data, such as data types, data names, data formats, or data structures defining the general content or makeup of the collected data, the manner in which the data is stored, variable names and identifiers of the data, etc. Thus, the data source templates in the data library 73 may enable the user to select vastly different types of data, stored in different formats or file structures, and having different naming conventions, properties, etc. associated therewith. Moreover, the data pointers in the data pointer library 73 may point to single value data or multiple value data, such as arrays of data. In one case, information defining the data structures, formats, and other parameters of the data associated with the various different input data pointers stored in the library 73 (referred to herein as input data source metadata) may be stored in and accessed from a database 73A. As examples only, the data source input definition tools could include indications to any types of data or sources of data including simple data (e.g., single value data) and complex data (e.g., multiple value data such as data arrays). Such input data definitions can include, for example, data sources such as DcomAccessPermissions, DcomApplication, DcomEndPoint, DcomLaunchAndActivationPermission, DDC, EJournal, FixUserPreferences, ImportExportProgressLog, IPConfig, MSInfo32, NetStat, OPC, Registry, SystemInfo, WindowsEventLog, WindowsTask, DCOM, DeltaVSettings, DT.SCR, LogicSolvers, Repeaters, ServerRoles, SystemInfo, WindowsErrorReporting, WindowsTask, etc. Other data sources could include controller event information, ping results, Downloadprogress.log, PowerFailInfo, LocalWin32Service, Firewall settings, Ethernet logs, PWU files, Journal files, SwitchSystemInfo, SwitchEventLog, UpgradePowerUpTest, MonitorMetrics, QNX crash log, DVBOPCSVR, DVBAccess, FrsOpcMr, SQLConfigurations, SQLMasterFiles, Boot.ini, BCDEdit, etc. Generally speaking, the data files collected from the customer sites can include data from different applications and other sources, such as operating system data files (e.g., DcomAccessPermissions, DcomApplication, DcomEndPoint, DcomLaunchAndActivationPermission, MSInfo32, Registry, SystemInfo, WindowsEventLog, WindowsTask, DCOM, ServerRoles, SystemInfo, WindowsErrorReporting, WindowsTask, LocalWin32Service, SQLConfigurations, SQLMasterFiles, Boot.ini, BCDEdit), process control system data files (e.g., DDC, EJournal, FixUserPreferences, ImportExportProgressLog, DeltaVSettings, DT.SCR, LogicSolvers, Repeaters, controller event information, Downloadprogress.log, PowerFailInfo, PWU files, Journal files, SwitchSystemInfo, SwitchEventLog, UpgradePowerUpTest, MonitorMetrics, QNX crash log, DVBOPCSVR, DVBAccess, FrsOpcMr), communication data files (e.g., IPConfig, NetStat, ping results, Firewall settings, Ethernet logs), to name but a few. As another example, the data source templates may reference or be indicative of any of various types of computer hardware and software applications, firmware, etc. data sources, including, for example, server/workstation hardware data sources, operating system data sources, controller data sources, batch data sources, network communication/infrastructure data sources (both primary and secondary network), operator interface data sources, database data sources, SWAT (Software and Application) data sources, SIS (Safety Instrumented Systems) data sources, OPC simplex and redundant/mirrored sever data sources, logbooks data sources, and virtualization data sources, to name but a few.

Of course when new data types are created or used, a new input data source tool can be added to the toolbox area 102 to provide a pointer to or a template for that data. For example when a new data type or data source is identified, the update process can 1) collect new data types, including metadata defining the data structure of the data type or source, from a customer's system, 2) send new data types to the existing analytic engines to be parsed, and 3) create a new data input tool for each new data type based on the format, parameters, and metadata associated with the new data type, and then the new tool can be provided to the rule builder application 64 as an update.

Still further, the logic or control flow element library 74 includes a set of logic rules or other programming flow control operation templates, such as If-Then logic statements, If-Then-Else logic statements, sequence statements, Do-While statements, Loop statements, or various other types of logical or flow control operations that may be used to define the flow logic of a rule to be used to test data specified as input data to a rule or to test other intermediate data defined by a rule. The logic or flow control operations stored in the library 74 may include any known or desired logic or programming flow control operations, and only a few such operations will be described herein. As examples only, the logic/flow control tools or templates could include any type of logic or program flow operations such as Assign (to assign a value to a variable, for example), Do-While, For-Each, If, Sequence, Switch, and While operations. These operations are all well-known programming flow control statements or logic operations and will not be further described herein. Moreover, any other types of programming control operations or logic operations could be included in these tools or templates.

Likewise, the output action library 76 may store a set of template output actions or output action templates that may be used to define actions to be taken in response to the detection of an issue. The output actions may be implemented, for example, in response to a logical determination made by the flow logic of a rule being created, such as a logical "true" or a logical "false" determination made by a logic operation when applied to particular data in the rule, such as input data.

Thus, generally speaking, the interface routine 70 operates to provide a graphic display to a user via the display 62 to allow the user to graphically create analytic rules. In one case, the interface routine 70 enables a user to create analytic rules by selecting combinations of (1) one or more data input source templates to be used in an analytic rule, (2) one or more logic or flow control operation templates to be used in an analytic rule, and (3) one or more output action templates to be taken by an analytic rule. The user may select the templates by selecting an indication of the templates in a library or toolbox region of a user interface screen and by dragging and dropping the selected templates into a workflow or canvas region of the user interface screen, or by otherwise specifying the template to use in some manner, in order to create or have the system create one or more data source components, one or more functional components, and one or more output components of an analytic rule within the workflow region. The user may then be presented with graphical interactive components, such as windows or boxes, within the workflow region for each of the selected templates, and be enabled to provide or fill in user-definable parameters associated with each of the components in the workflow region. When the user is finished creating an analytic rule, the user may provide the analytic rule to the logic compiler 71, which compiles the information of the analytic rule, as specified graphically by the user, into executable code. The compiler 71 may then store the executable analytic rule within a rule memory 76 which may be, for example, a local memory.

Moreover, as illustrated in FIG. 3, after the rule builder application 64 stores a new rule being created in the memory 76 (in the local system 60, for example), the runtime engine 69 may operate on or execute this analytic rule in, for example, a debugging mode, to enable the user to test the analytic rule being created. In particular, as illustrated in FIG. 3, the runtime engine 69 includes a data retriever application 77 and an execution engine 78. The execution engine 78 parses the analytic rule being executed to determine the indication of the data needed as input data to the analytic rule, and communicates with the data retriever application or interface 77 which executes on a processor to retrieve the specified data from one or more customer data files in the database 32, for example. The execution engine 78 then stores the input data as retrieved into a local memory 79 as one or more local variables, and applies the logic or flow control operation(s) as specified by the analytic rule to the input data to determine one or more logical results (e.g., true or false determinations, and/or logic statements, etc.). Still further, the execution engine 78 may apply or take the output action(s) specified by the analytic rule such as, for example, displaying a result of the analytic rule and a link or reference to one or more KBAs associated with the rule result. Of course, the execution engine 78 may operate in a debug mode and enable the user to view the particular steps of the logic as they execute, to determine potential errors in the analytic rule.

After the user is satisfied with the new analytic rule as created and tested, the user may have the rule builder application 64 provide the new analytic rule to the publisher application 66 (FIG. 2) for potential publication to other users, and/or for use by the analytic engine 50 (FIG. 2) when automatically analyzing customer data files.

Figure 4:
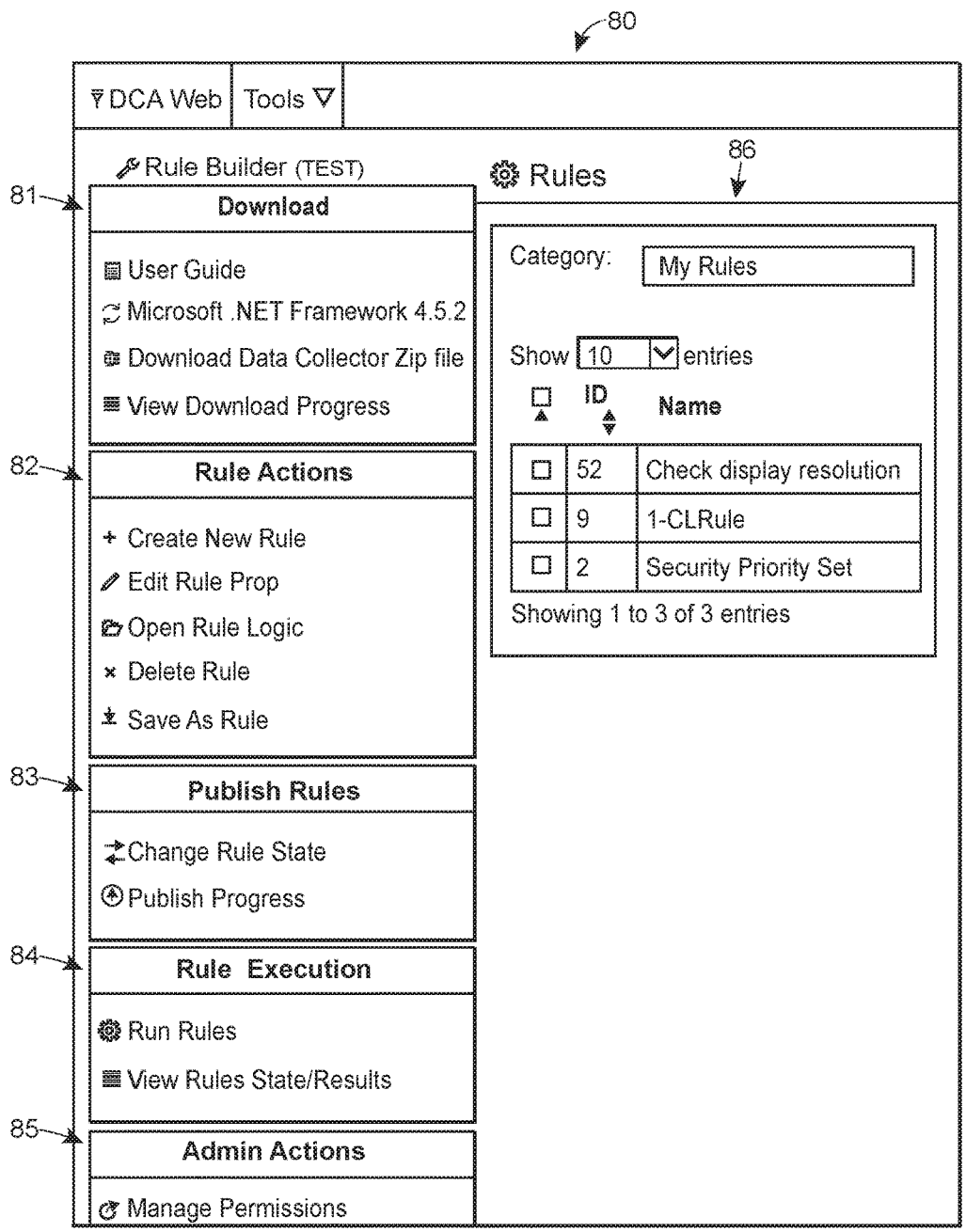
FIG. 4 depicts an example screen presentation that may be created by the rule builder application of FIG. 3 to take various actions with respect to building, testing, and publishing new analytic rules.

FIG. 4 illustrates an example screen display 80 that may be created by the interface routine 70 of the rule builder application 64 to enable a user, such as a local engineer at the station 60 (FIG. 2), to take various actions with respect to creating one or more analytic rules. The example screen display 80 of FIG. 4 includes a set of action menus in the left side of the screen, including download actions 81, rule actions 82, publish actions 83, rule execution actions 84, and administrative actions 85. Furthermore, the screen display 80 includes a list of rules 86 being created or that have been created by the user on the right hand side of the display. The user can select one or more of the rules in the list 86 to view or edit the rule, for example. Moreover, the user can use the selections in the various menus 81-85 to take actions with respect to a selected rule in the list 86. More particularly, the user may use the menu 82 to start the process of creating a new rule by selecting the "Create New Rule" link, may edit the properties of an existing rule by selecting the "Edit Rule Prop." link, may open and edit logic for a rule by selecting the "Open Rule Logic" link, may delete a rule by selecting the "Delete Rule" link, and may save a rule by selecting the "Save As Rule" link. Still further, the user may take actions associated with publishing a rule using the menu 83 to, for example, change rule publication states (e.g., request publication, etc.) or to view the publication progress of a particular rule, e.g., to view the current stage or state of the publication process of a particular rule. Likewise, the user may use the rule execution menu 84 to execute rules on a local or other analytic engine by selecting the "Run Rules" icon or link (which provides any of the selected rules in the display list 86 to the runtime engine 69 for execution), and may use the "View Rules State/Results" link or icon to view the state or results of such rules. This selection may include enabling the user to step through a rule in a debugging mode to enable the user to view the operation of the rule on an instruction by instruction basis, or on a step by step basis, based on predetermined or pre-identified break points in the rule. Such break points may be specified by the user when creating the rule or may be automatically determined based on the logic of the rule.

FIG. 5 illustrates an example screen display 90 that may be produced by the interface routine 70 of the rule builder application 64 as part of a user creating a new analytic rule. In this case, the screen display 90 includes a set of boxes or fields that may be filled in by the user to define the rule and parameters of the rule being created. For example, a first field 91 may be provided to enable the user to specify the domain or general hardware/software to which the rule is directed or with which the rule is associated. The user may enter such a domain or may select the domain from a preset or predetermined list of such domains. These lists or identification of domains may be based on the customer data files that are collected and may specify various different ones of the hardware, firmware, or software applications entities for which customer data is collected at customer site. These domains may be part of the data source metadata in the database 73A. If desired, the user may be able to create a new domains for new types of data to be collected from a customer site.

Likewise, a field 92 may enable the user to specify one or more symptoms associated with the operation of the customer hardware/firmware/software to which the rule is directed. For example, the user in the screen 90 of FIG. 5 has indicated that the symptom (manifestation of the problem or issue to be detected by the analytic rule being created) is a sluggishness of the entity defined in the domain (in this case, a particular operator interface device at the customer site).

Still further, a field 93 may be used to provide a name for the new rule while a field 94 may be used to provide a description or summary of the analytic rule being created. Importantly, a field 95 may be used to enable a rule developer or creator to define one or more rule actions that will be taken by the rule or that will occur as a result of one or more logical determinations made by the rule. In some cases, the action section or field 95 may define a display message to be provided as a result of the operation of the analytic rule. In other cases, the action may be a link to other applications that need to be run or executed as a result of the operation of the analytic rule, a link to another analytic rule that should be run or executed based on the outcome of this analytic rule, an alarm or warning that needs to be sent to another user at some other location or computer, the execution of or initiation of some other electronic or computer based action, etc. The various potential actions may be provided as parts of the library 75 of FIG. 3, if desired.

Still further, a field 96 may be used or provided to identify one or more KBAs that are associated with this rule and that may be provided in a display to a user of the analytic rule to provide more information about the issue detected by the operation of the analytic rule or to provide one or more solutions or actions to be taken to solve the issue. Of course, a set of radio buttons 97 may be used to save the rule parameters as specified in the screen 90, to open rule logic to define the logic or operations of the rule, or to cancel the rule, for example.

Figure 6:
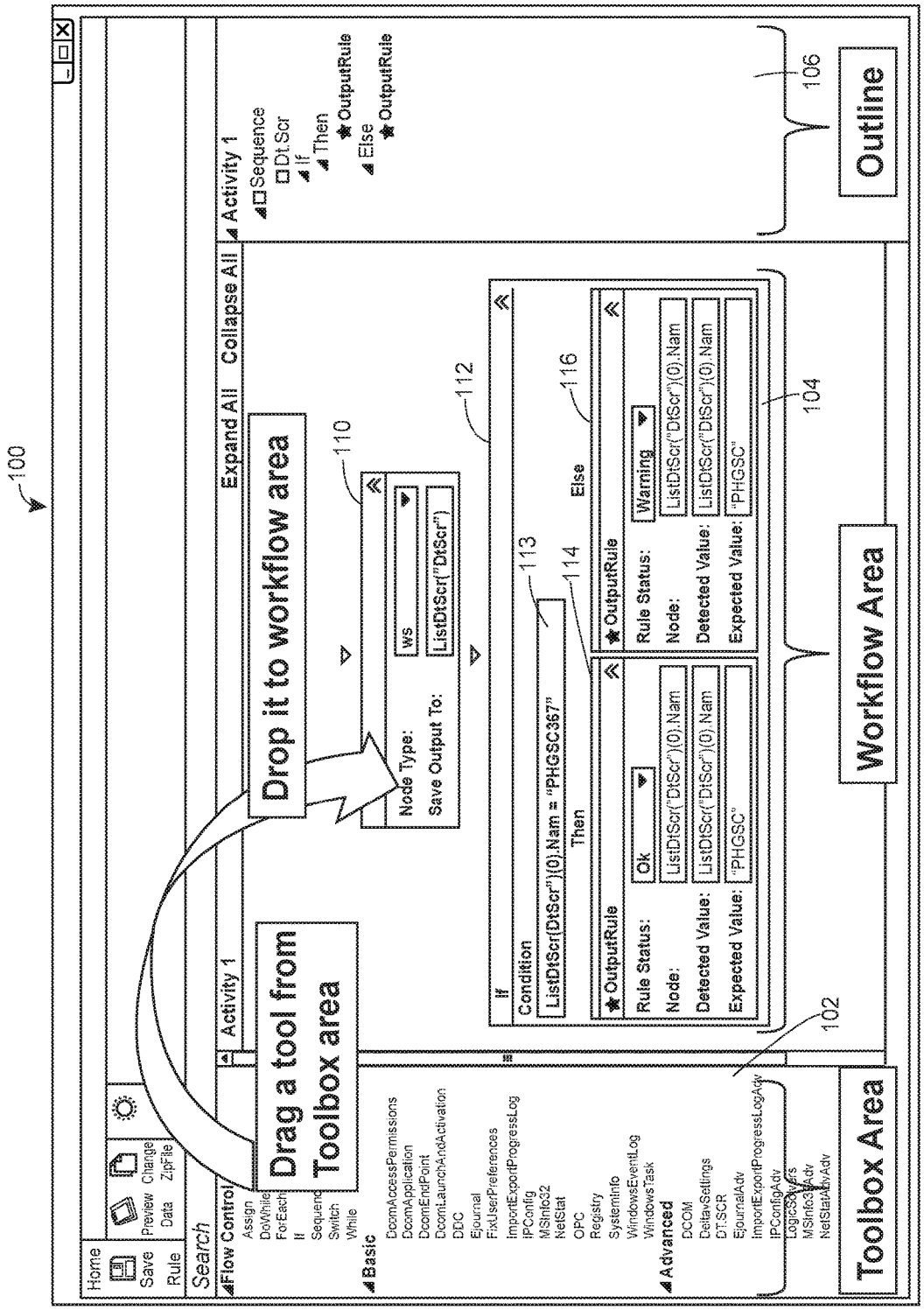
FIG. 6 depicts an example screen presentation that may be created by a rule builder application to enable a user to graphically define, view, and edit a new analytic rule.

FIG. 6 illustrates an example of graphical screen display 100 that may be displayed on the display 62 of FIG. 3, for example, by the interface routine 70 of the rule builder application 64 to enable a user to create or define the logic or programming associated with a new analytic rule. In particular, the graphical screen display 100 includes a toolbox area 102 (illustrated on the left hand side of the display 100), a workflow area 104 (illustrated in the center section of the display 100), and an outline area 106 (illustrated on the right hand side of the display 100). Generally speaking, the toolbox area 102 includes different sections or regions associated with various ones of the data source templates or library elements 73, the logic/flow control operation templates or library elements 74, and the output action templates or library elements 75 of FIG. 3. The toolbox area 102 therefore provide templates or basic graphical elements that a user may use to graphically create a new analytic rule in the workflow area 104.

Moreover, the workflow area 104 is a section of the screen 100 into which various elements (also called tools) from the toolbox area 102 may be dragged and dropped or otherwise placed, in a particular order or sequence, to create actual rule components, such as data source components, functional components, and output components, which together define the operation of the analytic rule. These components may then be added to or populated with particular rule parameter information to define the operation of a new analytic rule in a graphical manner. In particular, the configuration engine 68 (FIG. 3) may operate to execute a graphical input routine to display an interactive window for each of a set of rule components derived from the rule component templates, wherein the interactive window for each of the rule components enables a user to define specific parameters of each of the rule components. For example, the graphical input routine displays, for the data source component, a data input interactive window including one or more user-definable parameters specifying a specific set of data from a specific data source to be retrieved for the analytic rule. Moreover, the graphical input routine displays, for the functional component, one or more functional interactive windows including one or more user-definable parameters specifying one or more logical operations to be performed using the specific set of data from the specific data source. Still further, the graphical input routine displays, for the output component, an output interactive window including user-definable parameters specifying an action to be taken associated with a determination made by the one or more logical operations.

In a general sense, the outline area 106 provides an outline of the new analytic rule as this rule is created, including an indication of the data that is associated with the input of the analytic rule, the logic or flow control instructions associated the analytic rule, and the output actions to be taken in response to various of the operations of the analytic rule. The outline area 106 may also provide links to the various different graphical depictions of the elements of the analytic rule as shown within the workflow area 104, to enable a user to easily find a particular section of the graphical depiction of the analytic rule within the workflow area 104 when creating, editing, or viewing the analytic rule. The outline area 106 may therefore be used to easily navigate through the different graphical depictions of the various components of the analytic rule being created, which may be especially helpful in long or complex rules.

In the example graphical screen of FIG. 6, a particular rule is in the process of being created in the workflow area 104, and this rule is generally based on a logical If-Then-Else operation applied to a particular type of or source of input data, wherein the If-Then-Else determination produces a first output action, in which the rule status is defined as "OK", when a first logical determination is made (e.g., when the If statement is logically true), and wherein the If-Then-Else determination produces a second output action, in which the rule status is defined as "Warning," when a second logical determination is made (e.g., when the If statement is logically false). More particularly, as illustrated in FIG. 6, the workflow area 104 includes a data source graphical depiction 110 which represents an input data specification element or box that specifies the input data to be used as an input to the rule logic. The data source graphical depiction 110 may be created in the workflow area 104 by the user dragging one of the data tools (from an input data library or template section of the toolbox area 102) and dropping this data tool into the workflow area 104. The interface routine 70 of FIG. 3 recognizes this action as a request by the user to create a data source or data input component of an analytic rule and creates a box or data specification element 110 in the workflow area 104 in response to this request. The data specification element 110 (data source component) of FIG. 6 includes a set of parameters associated with the particular input data tool used or dragged to the workflow area 104. The parameters may be user-definable parameters which may be filled out by the user, and these parameters may indicate, for example, the particular source of data, such as data within a particular customer data file or a type of customer data file, the type of data, the format of the data, etc. The user may fill in these parameters to more particularly specify the data that is to be used in the rule as input data. The user may also fill in parameters to perform conversions on the data values, such as changing the data value to an integer value, rounding the data values, etc. Still further, the user may fill in parameters to provide a variable name for the data to be used in the analytic rule as one of the input data parameters.

Additionally, as illustrated in FIG. 6, the workflow area 104 includes a rule logic specification element or box 112 (a functional component) that specifies some logic of the analytic rule that is being created. The rule logic specification box 112 may be created by the user selecting and dragging one or more of a set of logic/flow control templates from the toolbox area 102 and dropping this indication or template onto the workflow area 104 at a point in a logic sequence to the executed by the analytic rule. The interface routine 70 of FIG. 3 recognizes this action as a request by the user to create a control logic element of an analytic rule and creates the box or rule logic specification element 112 in the workflow area 104 in response to this request. The flow control section of the toolbox area 102 includes logic/flow control indications associated with template logic functions and flow control functions to be applied or used in an analytic rule. The particular rule being created in the screen of FIG. 6 is an If-Then-Else logic rule having a first section 113 associated with or used for specifying the If statement defining a condition of the particular input (as, for example, specified by the input data box 110) to be tested. The condition statement in the block 113 is analyzed during execution of the analytic rule, and based on the results of the analysis, e.g., whether the logical expression is True or False, one of a set of output actions provided in further output action definition boxes 114 and 116 is implemented. In particular, a first output action definition box or element 114 indicates an output action to be applied in the instance in which the logical expression within the block 113 is True, and a second output action definition box or element 116 to be applied in the instance in which the logical expression within the block 113 is determined to be False. Again, the boxes or elements 114 and 116 may be specified by the user selecting and dragging various ones of the output action indications or templates illustrated in the output action section of the toolbox area 102 and dropping these indications in the proper location within the workflow area 104 to create editable rule components for an actual rule. The interface routine 70 of FIG. 3 recognizes this action as a request by the user to create an output action element of an analytic rule and creates the output action specification elements 114 and 116 the workflow area 104 in response to this request. The interface routine 70 may also update the outline section 106 of the screen 100 to indicate the logic or flow of the analytic rule being created.

Figure 7:
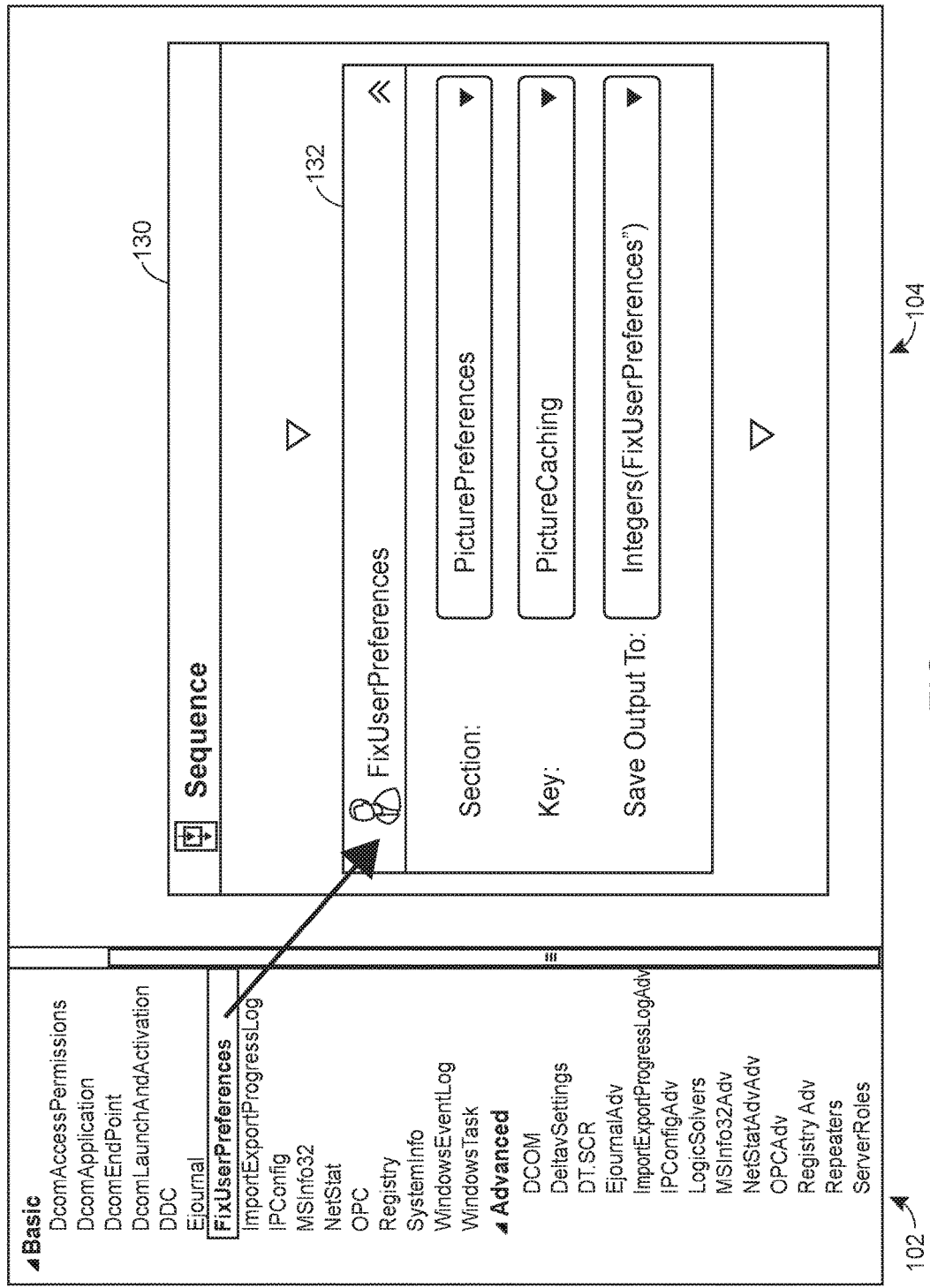
FIG. 7 depicts an example screen presentation that illustrates a user specifying a data input source for use as part of a new analytic rule being created.
Figure 8:
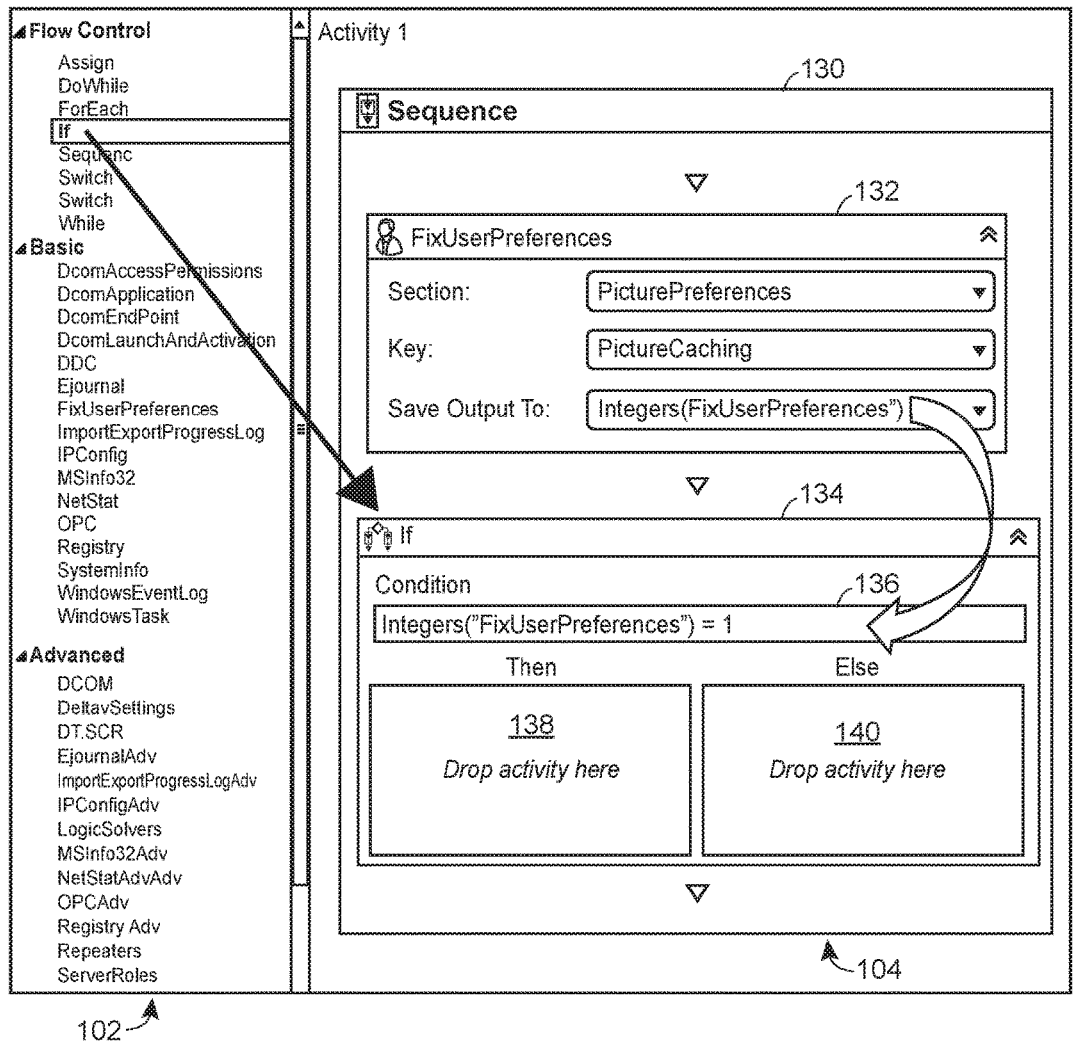
FIG. 8 depicts an example screen presentation that illustrates a user specifying a logic operation to apply to the data source specified in FIG. 7 when creating a new analytic rule.
Figure 9:
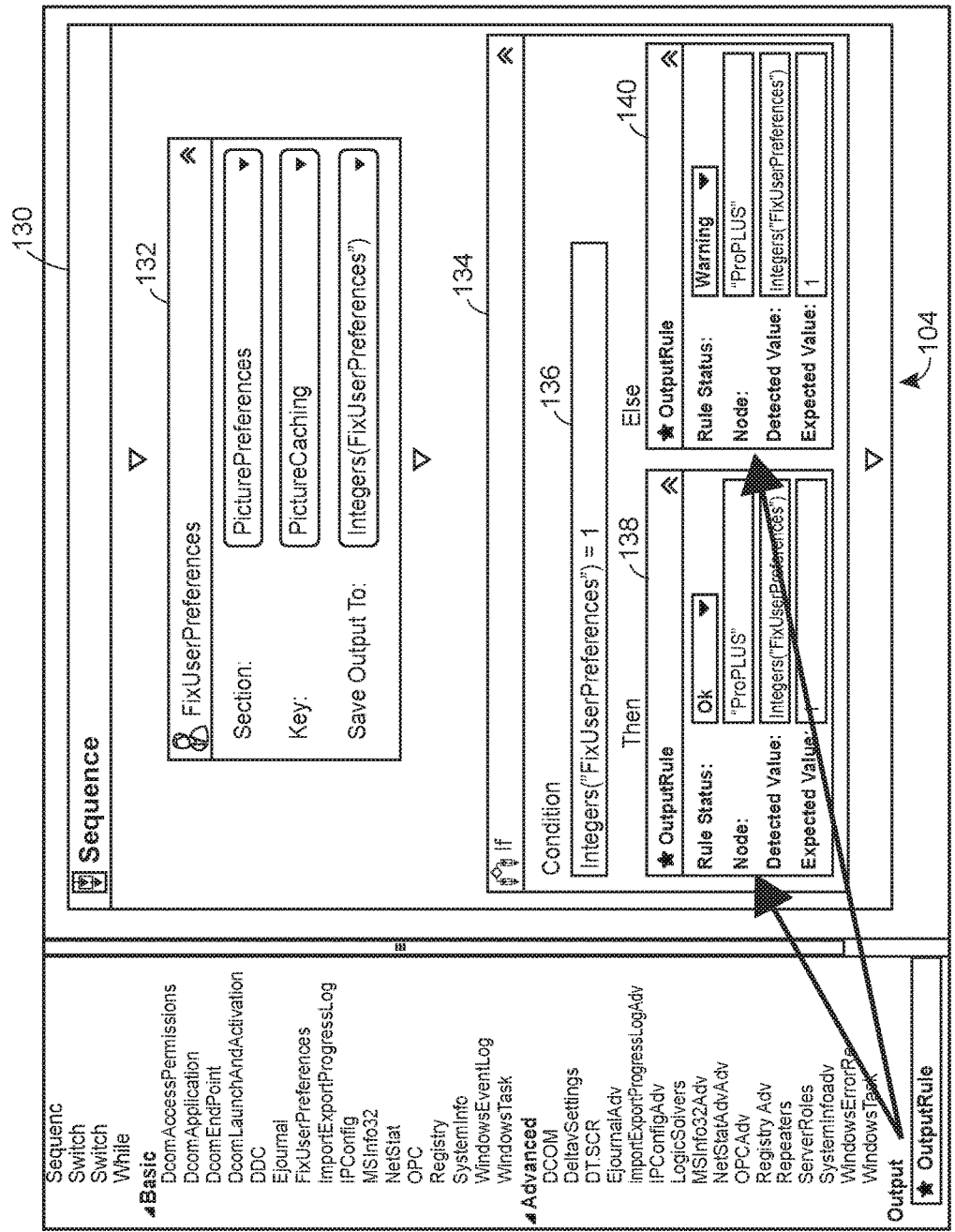
FIG. 9 depicts an example screen presentation that illustrates a user specifying two output actions for use in response to different logic flow situations of the logic operation specified in FIG. 8 when creating a new analytic rule.

FIGS. 7-9 depict screen displays associated with a further example of the creation of an analytic rule, and more particularly illustrates the individual steps used in creating a particular rule in more detail. In this example, a user interacts with a graphical user display 100 and, in particular, the toolbox area 102 of such a display to start creating an analytic rule. Here, the user first selects a sequence flow control element or indication within the toolbox area 106 and drops this element onto the workflow area 104 to create a sequence box or logic element 130. The sequence element 130 defines the order of operation or execution of the various blocks disposed within the sequence element 130. Next, as illustrated in FIG. 7 by the arrow, the user selects an input data source indication from the Basic tool section of the toolbox area 102 to create an indication of the input data to be used in the analytic rule and drops that indication into the sequence box 130, which defines the sequence of the analytic rule being created. In this example, the user selects the FixUserPreferences data source indication and drags and drops this indication into upper portion of the sequence box 130 in the workflow area 104. The user interface routine 70 creates a data input element 132 corresponding to this action to assist the user in defining the input data to be used in the analytic rule. In this case, the FixUserPreferences data source is a data file which is known and defined within the control system of a process plant. This data file has particular data of a particular type or types stored in particular and known format(s) which are defined by one or more sections, keys, columns, rows, metadata, organizational data, or other data structure information associated with that data source. This data structure information or data source metadata may be stored in and obtained from the database 73A of FIG. 3 for example. The information provided in the data input box 132 may be used to define the specific data or sections of the data available from the selected data source. Thus, in this case, the FixUserPreferences data source may include data defined by (or stored in a format that uses or that is addressable using) a section and a key. The user may input the section and key associated with the data to be used and, in doing so, may use drop down menus illustrating or providing enumerated lists defining the sections and keys available in or via this particular data source. Here, the user has selected the data defined by the "PicturePreferences" section and the "PictureCaching" key. Of course, the parameters to be specified via the input selection boxes in the data source input box 132 may be stored in memory and may be dependent upon the particular data source indication that is selected. Thus, other data source parameters, including other data format and storage indications or other metadata indicating parameters of, aspects of, or characteristics of data within the data source may be used or referenced as selectable parameters in other input data source determination boxes or elements. Moreover, the user may scroll through the data parameter boxes in the box 132 to specify the parameters of the input data source to be used to define the input data being selected. Of course, various different types of data sources or input data tools will have different types of data organized in different manners, and the organization of that data, and features or parameters of that data (referred to herein as metadata) may be used to define the properties or sub-boxes of the input boxes of the data input indication 132, to allow the user to easily find and specify the particular data that the user wants from the selected data file. Likewise, the user interface routine 70 (FIG. 3) may provide pop-up windows or other windows that enables the user to select a particular customer data input file for the selected input data tool and to view that data to view the structure of and the parameters associated with that data, all to assist the user in selecting the correct data fields of the selected data file.

Moreover, in the bottom of the data input selection box 132, the user may identify or define any mathematical operations to be performed on the values of the selected data (e.g., converting the data values to an integer, rounding the data values, etc.). Still further, the user may specify a name of the variable to be used in the analytic rule (and thus the local variable name of the selected data). In the example of FIG. 7, the user has programmed the input box 132 of the analytic rule to convert the selected data to an integer value (using the Integers(x) mathematical function) with the variable name "FixUserPreferences." Of course, the user could specify other variable names and other mathematical operations to be performed on the input data.

Next, after specifying the data to be used, any mathematical or other formatting operations to be performed on the data, and the variable name to be used for the data (which variable name is basically a local variable in the analytic engine or other engine running the analytic rule when created), the user may take the next step, as illustrated in FIG. 8, to define a logical operation to be applied to the data within the analytic rule. In this case, the user may drag and drop a flow control indication from the toolbox area 102 into the sequence box 130, to define a functional rule component that defines at least a part of the programming or flow logic to be used in the analytic rule. In this case, as illustrated by the arrow in FIG. 8, the user has selected an If-Then-Else logic indication from the toolbox area 102 and has dropped that indication into the sequence box 130 in a location below the box 132. In response, the user interface routine 70 creates a logic definition box 134 associated with or as defined by an If-Then-Else logical statement template. The format of the created logic definition box (such as the box 134) and the definable parameters that are associated with such a box will be dependent upon the logic expression or flow control operation to be applied. In this case, the box 134 includes a condition definition box or area 136 and two alternative rule output boxes 138 and 140.

Each of the boxes 136, 138, 140, which include user-definable parameters, may then be populated by the user to define the operation of the logic of the If-Then-Else statement of the analytic rule that is being created. In particular, the user may type into the condition box 136 the logic condition to be tested. For example, in this case, the user has specified that the condition to be tested is if the variable named FixUserPreferences (which is defined in the box 132) is equal to "1".

Next, as illustrated in FIG. 9, the user may fill in or specify the output components or action to be generated based on the logic or condition statement defined in the box 136. In particular, the user may select and drag, from the output action region of the toolbox area 102, separate output rules into the boxes 138 and 140 of FIG. 8, in order to define the actions of the logic statement (the If-Then-Else logic statement) of the analytic rule being created based on the conditions of the input data as determined by the logic statement. In this case, the output box 138 includes an output rule in which the user has defined a rule status as being "OK" if the condition statement in the box 136 is True, and the output box 140 includes an output rule in which the user has defined a rule status as being "Warning" if the condition statement in the box 136 is False. The output boxes 138 and 140 also include other information to be provided to a user, for example, as part of the output of the analytic rule itself, including an indication of the plant node for which the data was collected and the analytic rule was run, the detected value of the data, and the expected value of the data. Of course, the output boxes 138 and 140 could have other parameters in which other information to be provided as part of an output of the analytic rule can be defined or specified, either as changeable variables or as fixed values or information. Moreover, the interface routine 70 may provide the structure to enable the user to use any desired method of filling in the parameters of the boxes, such as the boxes 136-140, including typing in data, using a dropdown menu with an enumerated list, etc. For example, the rule status box may have a finite set of possible values as defined for a particular service center or application, such as OK, Warning, Information, Critical, etc., and in this case the rule status indicates the severity of a rule determination. Of course, other output action templates in the toolbox section 102 could provide other types of information, or specify other information, or indicate other actions to be taken based on the logic of an analytic rule.

As an example of an output action, FIG. 10 illustrates a visual output message 150 created by an analytic rule providing information as defined by the action and KBA fields of the rule (as defined in the fields 95 and 96 of FIG. 5 for example) and other information defined by the output logic boxes of the logic expression of the rule (as defined in the output rule boxes 138 and 140 of screens such as that of FIG. 9, for example). Thus, the message 150 indicates the node on which the rule was run or the symptom was detected, the symptom and rule name as defined in the graphical screen such as that of FIG. 5, and the action to be taken by the rule and the KBA for the rule, all as defined in a rule definition screen such as that of FIG. 5 for the analytic rule. Of course, the analytic rule could be used to provide other types of output actions as well or instead, including electronic actions like sending or setting alarms, notifications, etc., sending e-mails or other communications to effected customers or personnel, causing electronic or physical actions to occur at customer sites, such as updating security or operating system files, turning off machines, blocking communication ports, etc.

When the user has filled in all the parameter boxes associated with the rule components of a rule being created, and is satisfied with the analytic rule as graphically created, the user may then test the analytic rule by compiling the analytic rule into executable code (using the compiler 71, for example) and saving the analytic rule to local memory, for example, and providing the compiled or executable analytic rule to the runtime engine 79 using the screen commands of FIG. 4, for example. The execution engine and debugger application 69 may, for example, load the compiled analytic rule, allow the user to specify particular customer data to use in testing the rule, such a data file associated with a particular customer collected at a particular time (using a user interface window, for example), and then run or execute the analytic rule on that selected data file to produce an output of the analytic rule that is then provided to a user. When the user has debugged the analytic rule and found that the analytic rule works satisfactorily, the user may then store the analytic rule and use the analytic rule in the local system at any desired time. Still further, the user may publish the analytic rule by providing the analytic rule to the publisher application 66 of FIG. 2, in order to promote the analytic rule to be used in various other locations, by other engineers, etc.

Still further, the publisher application 66 may operate to receive one or more analytic rules that are potential analytic rules to be published, and may enforce a procedure that is required to actually cause a new analytic rule be published to the rules database 52 of FIG. 2 for use by others or in an automatic data analysis procedure run by an analytic engine, such as the engine 50 of FIG. 2. In particular, the publisher 66 may store, update, and indicate a status of the analytic rule being published to the rule provider or rule creator via a pending status parameter field. This status may be, for example, pending review, in review, published, failed review etc. and the publisher application 66 may update this status as the analytic rule progresses through the rule publication process. In one example, the publisher application 66 may take in new rules and put them in a list to be considered or a cue to be examined by an expert rule maker for potential publication. The publisher application 66 may require that a more experienced person such as manager of the support system 10 actually view an analytic rule (open it and view its contents) to assure that the logic of the analytic rule is reviewed. Still further, the publisher application 66 may require that the reviewer run the proposed analytic rule on test data and may assure that the reviewer selects some customer data file on which to run the analytic rule and then provides the analytic rule to the execution engine 69. The publisher application 66 may then allow the reviewer to provide an indication of whether or not to publish the analytic rule, and if the reviewer provides an indication that the analytic rule should be published, may publish the analytic rule and store this analytic rule in the rules database 52, as well as provide the analytic rule for use by the analytic engine 50 and other users at the same customer technical support center 10 or at other centers.

While a rule builder application and analytic system that uses this application has been described for use in a customer technical support center, such as that illustrated in FIGS. 1 and 2, the rule builder application described herein and an analytic engine with executes the analytic rules created by the rule builder application may be used in an on-line plant environment, such as in one or more workstations or other computer devices connected within a process plant, to perform on-line analysis to detect issues or unfavorable or undesirable situations in the plant on-line or in real time. For example, analytic rules could be created and run on-line in a process control plant to monitor for controller switch over. More particularly, when a controller switch over event occurs (e.g., when a primary controller fails and a backup controller takes over), the analytic rule may trigger data collection to collect an event log, a crash dump, and alarm & event files of the controller. The analytic rule may then analyze the data for a potential root cause of why the switch over occurred and notify on-site engineers. As another example, an analytic rule may be created to monitor free disk space in a computer or historian in the plant. If free disk space is low, i.e., below certain number/threshold, the analytic rule may analyze which rarely used old data to backup, and then may trigger one or more backup applications to back up identified data to backup drive. The analytic rule may also or instead notify on-site engineers. As a still further example, an analytic rule may be created that monitors/looks at a stream of data. If the rule finds a certain pattern of data that means something, the rule may trigger certain actions to prevent potential down time of on-line process control system. Of course, these are but a few examples of various analytic rules that could be created by plant personnel using a rule builder application at a plant site and that could be run or executed on-line at a plant site (as the process plant is running) to perform beneficial data analysis.

Figure 11:
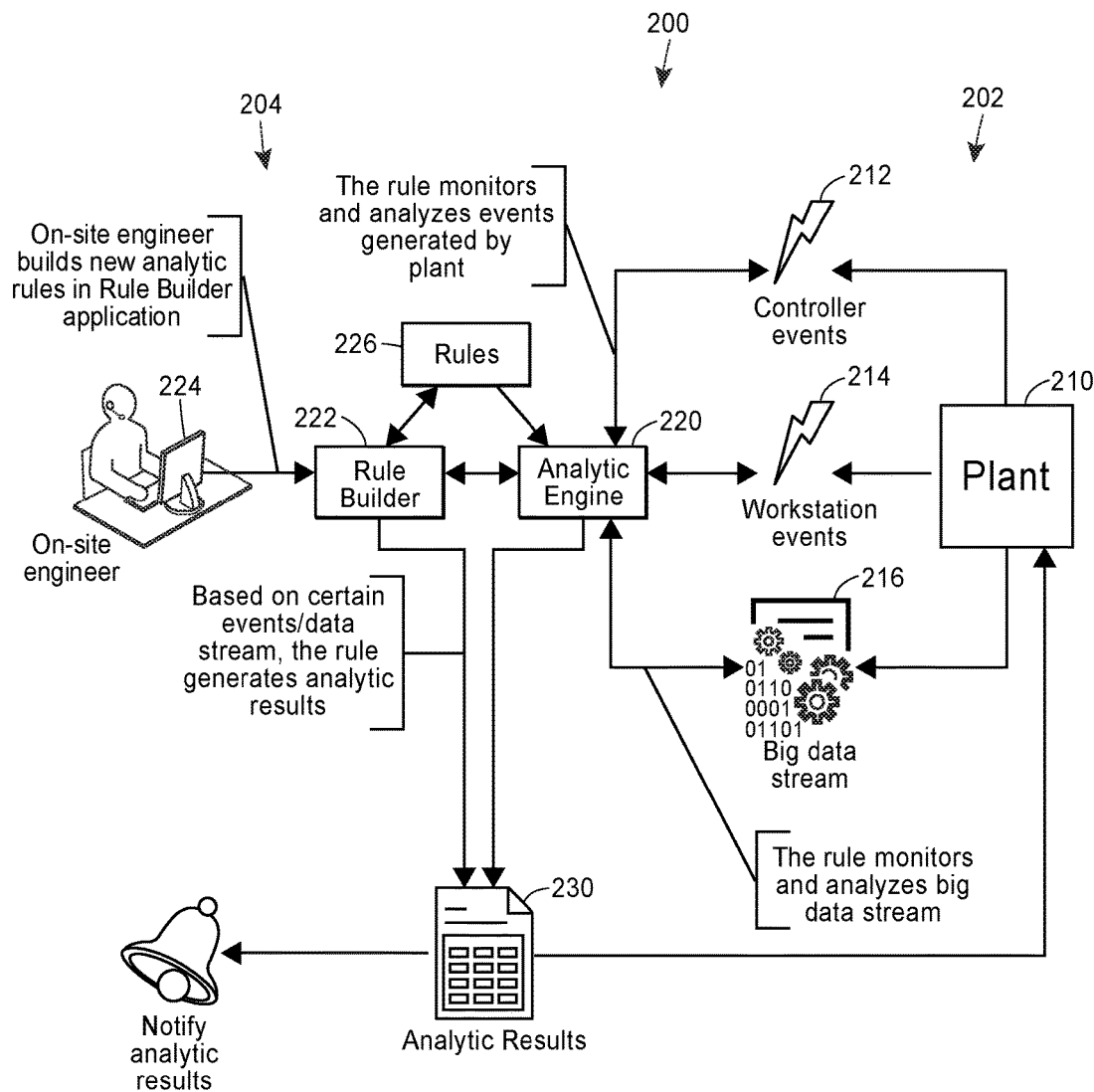
FIG. 11 depicts a diagram of an example system and method of using a rule builder application in an on-line plant environment to detect plant issues in real-time.

FIG. 11 illustrates an example plant system 200 that includes a rule builder application that may be used to develop and execute analytic rules on-line within a process plant environment. In particular the plant system 200 of FIG. 11 includes an on-line plant environment 202 and a rule development and execution environment 204. The on-line plant environment includes a plant (with process equipment and process control equipment) 210 operating to perform some process, such as manufacturing a product, refining oil, etc. The plant and process control equipment of the plant may include any number and types of process control devices, such as controllers, field devices, input/output devices, communication devices, workstations, such as operator and control workstations, data historians, configuration databases, etc. The plant may generate various types of data or data streams during on-line operation, including for example, controller events 212 (e.g., alarms, alerts, etc.), workstation events 214, and big data streams 216 collected by one or more big data appliances within the plant 210. Of course, these are but a few of the possible types of data that can be collected from or within the plant 210 and the plant equipment.

The rule development and execution environment 204, which may be executed in one or more computer devices within or connected to the plant environment 202 via any communication network, includes an analytic engine 220 and a rule builder application 222 coupled to, executed on or otherwise accessible from a local engineer workstation 224 or other workstation or processing device. The analytic engine 220 may store and execute one or more rules, stored in a rules database 226, to analyze any or all of the data streams 212, 214, 216 from the plant 210 during on-line operation of the plant 210. The analytic engine 220 may provide output analytic results 230 to the station 224 (or any other user or plant personnel) for viewing and display to the on-site engineer or to other plant personnel. The output analytic results may set or cause one or more alarms or alerts 234 or may take other actions within the plant environment, such as starting or stopping devices, setting parameters, collecting additional data, etc. In these cases, the output action defined by an analytic rule may initiate these or other actions in the plant 210.

Still further, the rule builder application 222 may be used by the on-site engineer (or other user) to create one or more new analytic rules for use in analyzing plant data or data streams. Here, the engineer at the station 224 may initiate the rule builder application 222 and create one or more new analytic rules in the manners described above. During that process, the engineer may test the rules in a debugging or test environment on plant data as collected from the plant 210, such as using the data streams 212, 214, 216, stored historical data, or any other data. The rule builder application may operate in the test environment and may provide analytic results 230 back to the engineer at the station 224, for example, for analysis and rule testing purposes. Moreover, when a rule is complete, the engineer at the station 224 may publish the rule to the database 226 for use in the on-line analysis performed by the analytic engine 220. Here, the rules in the database 226 may operate to monitor events or other data in the data streams 212, 214, 216 from the plant 210 and to generate analyses based on certain events or other data in these data streams.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Any of these modules, units, components, etc. may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules or routines can provide information to, and receive information from, other hardware and/or software modules and routines. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing a rule builder application and system for configuring and executing analytic rules as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed is:

1. A computer system for facilitating graphical construction of an analytic rule for use in analyzing data from a process plant, the computer system comprising:
   a non-transitory computer readable memory that stores a plurality of rule component templates, including one or more data source templates defining data sources within the process plant, one or more functional templates defining logic determination operations to be performed using data from the process plant, and one or more output templates indicating actions to be performed in response to a logic determination operation;
   a configuration engine that operates on the computer system, including:
      an interface routine that generates, via a user interface device:
         a library region that displays graphical depictions of the rule component templates, including one or more data source templates, one or more functional templates, and one or more output templates, and
         a workflow region that receives and displays rule components based on user selections of the graphical depictions of one or more rule component templates, the rule components including at least one data source component, one functional component, and one output component;
      wherein the configuration engine operates to execute a graphical input routine to display an interactive window for each of a set of rule components derived from the rule component templates, wherein the interactive window for each of the rule components enables a user to define specific parameters of each of the rule components, such that the graphical input routine displays, for the data source component, a data input interactive window including one or more user-definable parameters specifying a specific set of data from a specific data source to be retrieved for the analytic rule, such that the graphical input routine displays, for the functional component, one or more functional interactive windows including one or more user-definable parameters specifying one or more logical operations to be performed using the specific set of data from the specific data source, and such that the graphical input routine displays, for the output component, an output interactive window including user-definable parameters specifying an action to be taken associated with a determination made by the one or more logical operations;
   a compiler that executes on the computer system to compile the rule components including the user-defined parameters of each of the rule components, including the data source component, the functional component and the output component, into an executable analytic rule; and
   a runtime engine that executes on the computer system to execute the executable analytic rule.

2. The computer system of claim 1, wherein the non-transitory computer readable memory stores a set of metadata for each of the plurality of data source templates, the metadata for each of the data source templates defining a structure of the data from a data source.

3. The computer system of claim 2, wherein the metadata defines a structure of the data as stored in a data file obtained from the data source associated with a data source template.

4. The computer system of claim 2, wherein the user-definable parameters of the input data component includes an indication of one or more parameters defined in the metadata for a data source.

5. The computer system of claim 2, wherein the user-definable parameters of the input data component includes an indication of a row and a key.

6. The computer system of claim 2, wherein the user-definable parameters of the input data component includes a variable name for the data value of the data referenced by the data source component.

7. The computer system of claim 2, wherein the user-definable parameters of the data source component includes a mathematical operation to be applied to a data value referenced by the data source component.

8. The computer system of claim 1, wherein the user-definable parameters of the functional component include an indication of a variable name of data to be used in one of the one or more logical operations.

9. The computer system of claim 8, wherein the user-definable parameters of the functional component include an indication of a logical condition to be tested with respect to data specified by the variable name.

10. The computer system of claim 1, wherein the user-definable parameters of the functional component include an indication of an order of execution of one or more logical operations.

11. The computer system of claim 1, wherein the user-definable parameters of the output component include an indication of information to be provided as part of an output display.

12. The computer system of claim 1, wherein the user-definable parameters of the output component include an indication of a knowledge base article stored in a database which knowledge base article stores information related to correcting a detected issue.

13. The computer system of claim 1, wherein the user-definable parameters of the output component include an indication of an electronic communication to initiate in response to a determination made by a logical operation specified by a functional component.

14. The computer system of claim 1, wherein the user-definable parameters of the output component include an indication of a message to be provided to a user interface within or associated with a process plant.

15. The computer system of claim 1, wherein the data source templates define one of a server/workstation hardware data source, an operating system data source, a process controller data source, a batch data source, a network communication/infrastructure data source, an operator interface data source, a database data source, a software and application data source, a safety instrumented systems data source, an Open Platform Communications (OPC) simplex or redundant/mirrored sever data source, a logbook data source or a virtualization data source.

16. The computer system of claim 1, wherein the runtime engine includes an execution engine that executes the executable analytic rule and a data retriever that retrieves data from a data file stored in a database for a particular process plant site as specified by the data source component.

17. The computer system of claim 1, further including a database that stores a plurality of sets of customer data files, each of the plurality of sets of customer data files being associated with a different customer process plant site or with a different collection time at the same customer process plant site, and wherein the runtime engine executes the executable analytic rule using data from a specified one of the plurality of sets of customer data files.

18. The computer system of claim 17, wherein the runtime engine includes a user interactive component that enables a user to specify the one of the plurality of sets of customer data files to use.

19. The computer system of claim 1, further including a publisher routine that executes on a processor to publish the executable analytic rule to a rule database for use by other users.

20. The computer system of claim 1, wherein the interface routine further generates, via the user interface device, an outline region that displays a summary of the analytic rule displayed in the workflow region.

21. A computer implemented method of facilitating graphical construction of an analytic rule, comprising:
storing on a non-transitory computer readable memory a plurality of rule component templates, including one or more data source templates defining data sources within a process plant, one or more functional templates defining logic determination operations to be performed using data from the process plant, and one or more output templates indicating actions to be performed in response to a logic determination operation;
generating on a user interface device, using a computer processing device:
a library region that displays graphical depictions of the rule component templates, including one or more data source templates, one or more functional templates, and one or more output templates; and
a workflow region that receives and displays rule components based on user selections of the graphical depictions of one or more rule component templates, the rule components including at least one data source component, one functional component, and one output component;
generating, in the workflow region on the user interface device, using a computer processing device, an interactive window for each of a set of rule components derived from the rule component templates in response to a selection by a user of each of the set of rule component templates;
using the interactive window for each of the rule components to enable a user to define specific parameters of each of the rule components, including using, for the data source component, a data input interactive window including one or more user-definable parameters specifying a specific set of data from a specific data source to be retrieved for the analytic rule, using, for the functional component, one or more functional interactive windows including one or more user-definable parameters specifying one or more logical operations to be performed using the specific set of data from the specific data source, and using, for the output component, an output interactive window including user-definable parameters specifying an action to be taken associated with a determination made by the one or more logical operations;
compiling on the computer system, the rule components including the user-defined parameters of each of the rule components, including the data source component, the functional component and the output component, into an executable analytic rule; and
executing, on the computer processing device, the executable analytic rule.

22. The method of claim 21, further including storing, in a non-transitory computer readable memory, a set of metadata for each of the plurality of data source templates, the metadata for each of the plurality of data source templates defining a structure of the data from a data source.

23. The method of claim 22, wherein storing the metadata includes storing metadata that defines a structure of the data as stored in a data file obtained from the data source associated with a data source template.

24. The method of claim 22, wherein using the data input interactive window includes providing an indication of one or more values of one or more parameters defined in the metadata for a data source as part of the user-definable parameters.

25. The method of claim 22, wherein using the data input interactive window includes enabling a user to provide a variable name for the data value of the data referenced by the data source component.

26. The method of claim 22, wherein using the data input interactive window includes enabling a user to provide a mathematical operation to be applied to a data value referenced by the data source component.

27. The method of claim 22, wherein using the functional interactive window includes enabling a user to provide an indication of a variable name of data to be used in one of the one or more logical operations.

28. The method of claim 22, wherein using the functional interactive window includes enabling a user to provide an indication of a logical condition to be tested with respect to data specified by the variable name.

29. The method of claim 22, wherein using the functional interactive window includes enabling a user to provide an indication of an order of execution of one or more logical operations.

30. The method of claim 22, wherein using the output interactive window includes enabling a user to provide an indication of information to be provided as part of an output display.

31. The method of claim 30, wherein using the output interactive window includes enabling a user to provide an indication of a knowledge base article stored in a database, which knowledge base article stores information related to correcting a detected issue.

32. The method of claim 22, wherein using the output interactive window includes enabling a user to provide an indication of an electronic communication to initiate in response to a determination made by a logical operation specified by a functional component.

33. The method of claim 22, wherein storing the data source templates including storing data source templates defining one of a server/workstation hardware data source, an operating system data source, a process controller data source, a batch data source, a network communication/infrastructure data source, an operator interface data source, a database data source, a software and application data source, a safety instrumented systems data source, an Open Platform Communications (OPC) simplex or redundant/mirrored sever data source, a logbook data source or a virtualization data source.

34. The method of claim 21, further including storing, in a database, a plurality of sets of customer data files, each of the plurality of sets of customer data files being associated with a different customer process plant site or with a different collection time at the same customer process plant site, and wherein executing the executable analytic rule includes using data from a specified one of the plurality of sets of customer data files.

35. The method of claim 34, further including enabling, via an electronic display input device, a user to specify the specified one of the plurality of sets of customer data files to use.

36. The method of claim 21, further including generating, via the user interface device, an outline region that displays a summary of the analytic rule displayed in the workflow region.

37. A computer system for facilitating graphical construction of an analytic rule for use in analyzing data on-line in a process plant having process plant equipment that produces or stores on-line data, the computer system comprising:
a non-transitory computer readable memory that stores a plurality of rule component templates, including one or more data source templates defining data sources associated with the process plant equipment within the process plant, one or more functional templates defining logic determination operations to be performed using data from the process plant, and one or more output templates indicating actions to be performed in response to a logic determination operation;
a configuration engine that operates on the computer system, including:
an interface routine that generates, via a user interface device:
a library region that displays graphical depictions of the rule component templates, including one or more data source templates, one or more functional templates, and one or more output templates, and
a workflow region that receives and displays rule components based on user selections of the graphical depictions of one or more rule component templates, the rule components including at least one data source component, one functional component, and one output component;
wherein the configuration engine operates to execute a graphical input routine to display an interactive window for each of a set of rule components derived from the rule component templates, wherein the interactive window for each of the rule components enables a user to define specific parameters of each of the rule components, such that the graphical input routine displays, for the data source component, a data input interactive window including one or more user-definable parameters specifying a specific set of data from a specific data source to be retrieved for the analytic rule, such that the graphical input routine displays, for the functional component, one or more functional interactive windows including one or more user-definable parameters specifying one or more logical operations to be performed using the specific set of data from the specific data source, and such that the graphical input routine displays, for the output component, an output interactive window including user-definable parameters specifying an action to be taken associated with a determination made by the one or more logical operations;
a compiler that executes on the computer system to compile the rule components including the user-defined parameters of each of the rule components, including the data source component, the functional component and the output component, into an executable analytic rule; and
a runtime engine coupled to the process plant equipment that executes on the computer system to execute the executable analytic rule to analyze on-line data from the process plant.

38. The computer system of claim 37, wherein the non-transitory computer readable memory stores a set of metadata for each of the plurality of data source templates, the metadata for each of the data source templates defining a structure of the data from a data source within the process plant.

39. The computer system of claim 38, wherein the user-definable parameters of the input data component includes an indication of one or more parameters defined in the metadata for a data source.

40. The computer system of claim 38, wherein the user-definable parameters of the input data component includes a variable name for the data value of the data referenced by the data source component.

41. The computer system of claim 37, wherein the user-definable parameters of the data source component includes a mathematical operation to be applied to a data value referenced by the data source component.

42. The computer system of claim 37, wherein the user-definable parameters of the functional component include an indication of a logical condition to be tested with respect to data specified by the variable name.

43. The computer system of claim 37, wherein the user-definable parameters of the output component include an indication of information to be provided as part of an output display.

44. The computer system of claim 37, wherein the user-definable parameters of the output component include an indication of a knowledge base article stored in a database, which knowledge base article stores information related to correcting a detected issue.

45. The computer system of claim 37, wherein the user-definable parameters of the output component include an indication of an electronic communications within a process plant control system to initiate in response to a determination made by a logical operation specified by a functional component.

46. The computer system of claim 37, wherein the user-definable parameters of the output component include an indication of a message to be provided to a process control operator associated with the process plant.

47. The computer system of claim 37, wherein one of the data source templates references a data stream from a process control system of the process plant.

48. The computer system of claim 47, wherein the one of the data source templates references data related to process controller events within the process plant.

49. The computer system of claim 47, wherein the one of the data source templates references data related to user workstation events within the process plant.

* * * * *